United States Patent
Podgorny et al.

(10) Patent No.: US 10,922,367 B2
(45) Date of Patent: Feb. 16, 2021

(54) METHOD AND SYSTEM FOR PROVIDING REAL TIME SEARCH PREVIEW PERSONALIZATION IN DATA MANAGEMENT SYSTEMS

(71) Applicant: Intuit Inc., Mountain View, CA (US)

(72) Inventors: Igor A. Podgorny, San Diego, CA (US); Benjamin Indyk, San Diego, CA (US); Ling Feng Wei, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 161 days.

(21) Appl. No.: 15/957,365

(22) Filed: Apr. 19, 2018

(65) Prior Publication Data

US 2019/0018899 A1    Jan. 17, 2019

Related U.S. Application Data

(63) Continuation-in-part of application No. 15/650,236, filed on Jul. 14, 2017.

(51) Int. Cl.
  *G06F 16/9535*    (2019.01)
  *G06N 20/00*    (2019.01)
  (Continued)

(52) U.S. Cl.
  CPC ......... *G06F 16/9535* (2019.01); *G06F 9/453* (2018.02); *G06F 16/248* (2019.01);
  (Continued)

(58) Field of Classification Search
  CPC .... G06F 9/453; G06F 16/9535; G06F 16/248; G06F 16/338; G06F 16/9038;
  (Continued)

(56) References Cited

U.S. PATENT DOCUMENTS 5,471,382 A    11/1995 Tallman et al.
5,519,608 A    5/1996 Kupiec
(Continued)

FOREIGN PATENT DOCUMENTS

AU    2001259223 B2    11/2011
CN    101520802    4/2009
(Continued)

OTHER PUBLICATIONS

Blei, David M., et al. "Latent Dirichlet Allocation;" Journal of Machine Learning Research 3, Jan. 2003, pp. 993-1022.
(Continued)

*Primary Examiner* — Nicholas Ulrich
(74) *Attorney, Agent, or Firm* — Paradice and Li LLP

(57) ABSTRACT

A method and system provides personalized search results to users of a data management system. The method and system receives a search query from a user and generate initial search results including a plurality of assistance documents relevant to the query data. The method and system utilizes natural language analysis and machine learning processes to analyze the query data, user attributes data, and the assistance documents in order to generate personalized previews of the assistance documents for the user. The method and system output personalized search results to the user including the personalized previews of the assistance documents.

28 Claims, 5 Drawing Sheets

(51) Int. Cl.

| | | |
|---|---|---|
| *G06F 40/30* | (2020.01) | |
| *G06F 40/216* | (2020.01) | |
| *G06F 16/9038* | (2019.01) | |
| *G06F 9/451* | (2018.01) | |
| *G06F 40/205* | (2020.01) | |
| *G06F 16/338* | (2019.01) | |
| *G06F 16/248* | (2019.01) | |

(52) U.S. Cl.
CPC ........ *G06F 16/338* (2019.01); *G06F 16/9038* (2019.01); *G06F 40/205* (2020.01); *G06F 40/216* (2020.01); *G06F 40/30* (2020.01); *G06N 20/00* (2019.01)

(58) Field of Classification Search
CPC ...... G06F 40/205; G06F 40/30; G06F 40/216; G06N 20/00
See application file for complete search history.

(56) References Cited

U.S. PATENT DOCUMENTS

| | | | |
|---|---|---|---|
| 5,701,399 A | 12/1997 | Lee et al. | |
| 6,006,218 A | 12/1999 | Breese et al. | |
| 6,147,975 A | 11/2000 | Bowman-Amuah | |
| 6,256,633 B1 | 7/2001 | Dharap | |
| 6,349,307 B1 | 2/2002 | Chen | |
| 6,513,036 B2 | 1/2003 | Fruensgaard et al. | |
| 6,564,213 B1 | 5/2003 | Ortega et al. | |
| 6,601,055 B1 | 7/2003 | Roberts | |
| 6,708,172 B1 | 3/2004 | Wong et al. | |
| 6,853,982 B2 | 2/2005 | Smith et al. | |
| 7,013,263 B1 | 3/2006 | Isaka et al. | |
| 7,222,078 B2 | 5/2007 | Abelow | |
| 7,385,716 B1 | 6/2008 | Skaanning | |
| 7,565,312 B1 | 7/2009 | Shaw et al. | |
| 7,587,387 B2* | 9/2009 | Hogue ............... G06F 16/951 | |
| 7,594,176 B1 | 9/2009 | English | |
| 7,603,301 B1 | 10/2009 | Regan | |
| 7,610,226 B1 | 10/2009 | Miller | |
| 7,627,504 B2 | 12/2009 | Brady et al. | |
| 7,685,144 B1 | 3/2010 | Katragadda | |
| 7,739,286 B2 | 6/2010 | Sethy et al. | |
| 7,747,601 B2 | 6/2010 | Cooper et al. | |
| 7,966,282 B2 | 6/2011 | Pinckney et al. | |
| 7,974,860 B1 | 7/2011 | Travis | |
| 8,010,545 B2 | 8/2011 | Stefik et al. | |
| 8,019,753 B2* | 9/2011 | Podgorny ............... G06Q 10/10 707/722 | |
| 8,185,517 B1 | 5/2012 | Wood et al. | |
| 8,200,527 B1 | 6/2012 | Thompson et al. | |
| 8,209,333 B2 | 6/2012 | Hubbard et al. | |
| 8,271,471 B1 | 9/2012 | Kamvar et al. | |
| 8,311,792 B1 | 11/2012 | Podgorny et al. | |
| 8,311,863 B1 | 11/2012 | Kemp | |
| 8,341,167 B1 | 12/2012 | Podgorny et al. | |
| 8,473,339 B1 | 6/2013 | McKennon et al. | |
| 8,478,780 B2 | 7/2013 | Cooper et al. | |
| 8,484,228 B2 | 7/2013 | Bhattacharyya et al. | |
| 8,631,006 B1* | 1/2014 | Haveliwala ........... G06F 16/345 707/732 | |
| 8,645,298 B2 | 2/2014 | Hennig et al. | |
| 8,660,849 B2 | 2/2014 | Gruber et al. | |
| 8,732,222 B2 | 5/2014 | Horvitz et al. | |
| 8,805,734 B2 | 8/2014 | Diana et al. | |
| 8,817,968 B1 | 8/2014 | Boutcher et al. | |
| 8,850,490 B1 | 9/2014 | Thomas et al. | |
| 8,892,539 B2 | 11/2014 | Anand et al. | |
| 8,909,568 B1 | 12/2014 | Mann et al. | |
| 8,935,192 B1 | 1/2015 | Ventilla et al. | |
| 8,943,145 B1 | 1/2015 | Peters et al. | |
| 8,972,318 B2 | 3/2015 | Prakash et al. | |
| 8,983,977 B2 | 3/2015 | Ishikawa et al. | |
| 9,015,031 B2 | 4/2015 | Ferrucci et al. | |
| 9,037,578 B2 | 5/2015 | Brust et al. | |
| 9,060,062 B1 | 6/2015 | Madahar et al. | |
| 9,063,983 B1 | 6/2015 | Lee | |
| 9,229,974 B1* | 1/2016 | Lee ................... G06F 16/35 | |
| 9,235,626 B2* | 1/2016 | Liu ................... G06F 16/93 | |
| 9,247,066 B1 | 1/2016 | Stec et al. | |
| 9,336,211 B1 | 5/2016 | Bousquet et al. | |
| 9,336,269 B1 | 5/2016 | Smith et al. | |
| 9,342,608 B2 | 5/2016 | Cook et al. | |
| 9,460,191 B1 | 10/2016 | Gaucher et al. | |
| 9,471,883 B2 | 10/2016 | Chatterjee et al. | |
| 9,582,757 B1 | 2/2017 | Holmes et al. | |
| 9,633,309 B2 | 4/2017 | Giffels et al. | |
| 9,767,169 B1 | 9/2017 | Paff et al. | |
| 9,779,388 B1 | 10/2017 | Hansen et al. | |
| 9,881,102 B2 | 1/2018 | Gordner et al. | |
| 9,887,887 B2 | 2/2018 | Hunter et al. | |
| 9,892,367 B2 | 2/2018 | Guo et al. | |
| 9,910,886 B2 | 3/2018 | Adams, Jr. et al. | |
| 10,002,177 B1 | 6/2018 | McClintock et al. | |
| 10,049,664 B1 | 8/2018 | Indyk et al. | |
| 10,083,213 B1 | 9/2018 | Podgorny et al. | |
| 10,134,050 B1 | 11/2018 | Hung et al. | |
| 10,147,037 B1 | 12/2018 | Podgorny et al. | |
| 10,162,734 B1 | 12/2018 | Podgorny et al. | |
| 10,210,244 B1 | 2/2019 | Branavan et al. | |
| 10,354,182 B2 | 7/2019 | Chang et al. | |
| 10,460,398 B1 | 10/2019 | Gielow et al. | |
| 10,475,044 B1 | 11/2019 | Cannon et al. | |
| 10,522,134 B1 | 12/2019 | Matsoukas | |
| 10,552,843 B1 | 2/2020 | Podgorny et al. | |
| 10,579,625 B2* | 3/2020 | Cho ................... G06Q 30/0625 | |
| 10,748,157 B1 | 8/2020 | Indyk et al. | |
| 10,755,294 B1 | 8/2020 | Podgorny et al. | |
| 2002/0087387 A1 | 7/2002 | Calver et al. | |
| 2002/0111888 A1 | 8/2002 | Stanley et al. | |
| 2002/0111926 A1 | 8/2002 | Bebie | |
| 2002/0123983 A1 | 9/2002 | Riley et al. | |
| 2002/0169595 A1 | 11/2002 | Agichtein et al. | |
| 2003/0028448 A1 | 2/2003 | Joseph et al. | |
| 2003/0061131 A1 | 3/2003 | Parkan | |
| 2003/0099924 A1 | 5/2003 | Tsuboi et al. | |
| 2003/0101161 A1 | 5/2003 | Ferguson et al. | |
| 2003/0144873 A1 | 7/2003 | Keshel | |
| 2004/0024739 A1 | 2/2004 | Copperman et al. | |
| 2004/0034652 A1 | 2/2004 | Hofmann et al. | |
| 2004/0064442 A1 | 4/2004 | Popovitch | |
| 2005/0086290 A1 | 4/2005 | Joyce et al. | |
| 2005/0114327 A1 | 5/2005 | Kumamoto et al. | |
| 2005/0137939 A1 | 6/2005 | Calabria et al. | |
| 2005/0222989 A1 | 10/2005 | Haveliwala et al. | |
| 2005/0246314 A1 | 11/2005 | Eder | |
| 2006/0064322 A1 | 3/2006 | Mascarenhas et al. | |
| 2006/0074788 A1 | 4/2006 | Grizack et al. | |
| 2006/0085255 A1 | 4/2006 | Hastings et al. | |
| 2006/0085750 A1 | 4/2006 | Easton et al. | |
| 2006/0253578 A1 | 11/2006 | Dixon et al. | |
| 2006/0265232 A1 | 11/2006 | Katariya et al. | |
| 2007/0011131 A1 | 1/2007 | Delefevre | |
| 2007/0143262 A1 | 6/2007 | Kasperski | |
| 2007/0192166 A1 | 8/2007 | Van Luchene | |
| 2007/0192168 A1 | 8/2007 | Van Luchene | |
| 2007/0192179 A1 | 8/2007 | Van Luchene | |
| 2007/0219863 A1 | 9/2007 | Park et al. | |
| 2007/0244900 A1 | 10/2007 | Hopkins et al. | |
| 2007/0259325 A1 | 11/2007 | Clapper | |
| 2007/0291739 A1 | 12/2007 | Sullivan et al. | |
| 2007/0294195 A1 | 12/2007 | Curry et al. | |
| 2008/0189197 A1 | 8/2008 | Allanson et al. | |
| 2008/0201413 A1 | 8/2008 | Sullivan et al. | |
| 2008/0208610 A1 | 8/2008 | Thomas et al. | |
| 2008/0214151 A1 | 9/2008 | Ramer et al. | |
| 2008/0215541 A1 | 9/2008 | Li et al. | |
| 2008/0248815 A1 | 10/2008 | Busch | |
| 2008/0294637 A1 | 11/2008 | Liu | |
| 2009/0012926 A1 | 1/2009 | Ishikawa et al. | |
| 2009/0077047 A1 | 3/2009 | Cooper et al. | |
| 2009/0089286 A1* | 4/2009 | Kumar ............... G06F 16/9535 | |
| 2009/0119575 A1 | 5/2009 | Velusamy | |
| 2009/0158143 A1 | 6/2009 | Arav | |

(56) References Cited

U.S. PATENT DOCUMENTS

| | | |
|---|---|---|
| 2009/0162824 A1 | 6/2009 | Heck |
| 2009/0198667 A1* | 8/2009 | Groeneveld .......... G06F 16/345 |
| 2009/0248659 A1 | 10/2009 | McCool et al. |
| 2009/0253112 A1 | 10/2009 | Cao et al. |
| 2009/0259642 A1 | 10/2009 | Cao et al. |
| 2009/0265340 A1 | 10/2009 | Barcklay et al. |
| 2009/0292609 A1 | 11/2009 | Vaidyanathan |
| 2010/0068687 A1 | 3/2010 | Bertelsen |
| 2010/0070554 A1 | 3/2010 | Richardson et al. |
| 2010/0076847 A1 | 3/2010 | Heller |
| 2010/0076998 A1 | 3/2010 | Podgorny et al. |
| 2010/0088262 A1 | 4/2010 | Visel et al. |
| 2010/0138451 A1 | 6/2010 | Henkin et al. |
| 2010/0185630 A1 | 7/2010 | Cheng et al. |
| 2010/0191686 A1 | 7/2010 | Wang et al. |
| 2010/0203492 A1 | 8/2010 | Nibe et al. |
| 2010/0205180 A1 | 8/2010 | Cooper et al. |
| 2010/0205550 A1 | 8/2010 | Chen et al. |
| 2010/0228744 A1* | 9/2010 | Craswell ............ G06F 16/9577 |
| | | 707/751 |
| 2010/0235361 A1 | 9/2010 | Chandran et al. |
| 2010/0241507 A1 | 9/2010 | Quinn et al. |
| 2010/0241971 A1 | 9/2010 | Zuber |
| 2010/0318919 A1 | 12/2010 | Murphy et al. |
| 2011/0055110 A1 | 3/2011 | Kolyvanov et al. |
| 2011/0055699 A1 | 3/2011 | Li et al. |
| 2011/0071997 A1 | 3/2011 | Sullivan et al. |
| 2011/0106895 A1 | 5/2011 | Ventilla et al. |
| 2011/0125734 A1 | 5/2011 | Duboue et al. |
| 2011/0202472 A1 | 8/2011 | Wan et al. |
| 2011/0231347 A1 | 9/2011 | Xu et al. |
| 2011/0246334 A1 | 10/2011 | Schoenberg et al. |
| 2011/0264569 A1 | 10/2011 | Houseworth et al. |
| 2011/0282892 A1 | 11/2011 | Castellani et al. |
| 2011/0295612 A1 | 12/2011 | Donneau-Golencer et al. |
| 2012/0005148 A1 | 1/2012 | Horvitz et al. |
| 2012/0005219 A1 | 1/2012 | Apacible et al. |
| 2012/0022983 A1 | 1/2012 | Hughes et al. |
| 2012/0030079 A1 | 2/2012 | Slater et al. |
| 2012/0077178 A1 | 3/2012 | Bagchi et al. |
| 2012/0084120 A1 | 4/2012 | Hirsch et al. |
| 2012/0084185 A1 | 4/2012 | Ciaramitaro et al. |
| 2012/0084279 A1* | 4/2012 | Driscoll ............ G06F 16/9535 |
| | | 707/722 |
| 2012/0084293 A1 | 4/2012 | Brown et al. |
| 2012/0095976 A1 | 4/2012 | Hebenthal et al. |
| 2012/0101965 A1 | 4/2012 | Hennig et al. |
| 2012/0130910 A1 | 5/2012 | Al-Alami |
| 2012/0130978 A1 | 5/2012 | Li et al. |
| 2012/0136764 A1 | 5/2012 | Miller et al. |
| 2012/0150861 A1* | 6/2012 | Thione ................ G06F 16/9038 |
| | | 707/741 |
| 2012/0166438 A1 | 6/2012 | Wu et al. |
| 2012/0219142 A1 | 8/2012 | Gould |
| 2012/0221557 A1 | 8/2012 | Edmonds et al. |
| 2012/0233191 A1 | 9/2012 | Ramanujam |
| 2012/0331052 A1 | 12/2012 | Rathod |
| 2013/0019286 A1 | 1/2013 | Barborak et al. |
| 2013/0024290 A1 | 1/2013 | Berg et al. |
| 2013/0054497 A1 | 2/2013 | Garland et al. |
| 2013/0066693 A1 | 3/2013 | Laird-Mcconnell et al. |
| 2013/0073387 A1 | 3/2013 | Heath |
| 2013/0073390 A1 | 3/2013 | Konig et al. |
| 2013/0103493 A1 | 4/2013 | Gao et al. |
| 2013/0110671 A1 | 5/2013 | Gray |
| 2013/0110823 A1 | 5/2013 | Su et al. |
| 2013/0111323 A1 | 5/2013 | Taghaddos et al. |
| 2013/0117677 A1 | 5/2013 | St. Jacques, Jr. |
| 2013/0124449 A1 | 5/2013 | Pinckney et al. |
| 2013/0204876 A1 | 8/2013 | Szucs et al. |
| 2013/0224713 A1 | 8/2013 | Ajmera et al. |
| 2013/0268319 A1 | 10/2013 | Palombo |
| 2013/0275408 A1* | 10/2013 | Rodriguez .......... G06F 16/9038 |
| | | 707/722 |
| 2013/0282363 A1 | 10/2013 | Fan et al. |
| 2013/0285855 A1 | 10/2013 | Dupray et al. |
| 2013/0297545 A1 | 11/2013 | Bierner et al. |
| 2013/0297553 A1 | 11/2013 | Bierner |
| 2013/0297625 A1 | 11/2013 | Bierner et al. |
| 2013/0304730 A1 | 11/2013 | Zhou |
| 2013/0325992 A1 | 12/2013 | McGann et al. |
| 2013/0339870 A1 | 12/2013 | Tandra Sishtla et al. |
| 2014/0006012 A1 | 1/2014 | Zhou et al. |
| 2014/0022328 A1 | 1/2014 | Gechter et al. |
| 2014/0052496 A1 | 2/2014 | Diana et al. |
| 2014/0052606 A1 | 2/2014 | Vasudevan et al. |
| 2014/0075004 A1 | 3/2014 | Van Dusen et al. |
| 2014/0088944 A1 | 3/2014 | Natarajan et al. |
| 2014/0114822 A1 | 4/2014 | Sharma et al. |
| 2014/0119531 A1 | 5/2014 | Tuchman et al. |
| 2014/0172883 A1 | 6/2014 | Clark et al. |
| 2014/0181652 A1 | 6/2014 | Stanke et al. |
| 2014/0189829 A1 | 7/2014 | McLachlan et al. |
| 2014/0195613 A1 | 7/2014 | Ogilvie |
| 2014/0201045 A1 | 7/2014 | Pai et al. |
| 2014/0222669 A1 | 8/2014 | Novak et al. |
| 2014/0244528 A1 | 8/2014 | Zhang et al. |
| 2014/0280055 A1* | 9/2014 | Chang ................ G06F 16/9535 |
| | | 707/722 |
| 2014/0280070 A1 | 9/2014 | George et al. |
| 2014/0308648 A1 | 10/2014 | Jain |
| 2014/0316856 A1 | 10/2014 | Williams et al. |
| 2014/0324856 A1 | 10/2014 | Lahiani et al. |
| 2014/0337257 A1 | 11/2014 | Chatterjee et al. |
| 2014/0372980 A1 | 12/2014 | Verma et al. |
| 2015/0006344 A1 | 1/2015 | Saimani et al. |
| 2015/0052087 A1 | 2/2015 | Srinivasan et al. |
| 2015/0058380 A1 | 2/2015 | Polonsky et al. |
| 2015/0088608 A1 | 3/2015 | Cama et al. |
| 2015/0095267 A1 | 4/2015 | Behere et al. |
| 2015/0120718 A1 | 4/2015 | Luo et al. |
| 2015/0127587 A1 | 5/2015 | Pinckney et al. |
| 2015/0139415 A1 | 5/2015 | Skiba et al. |
| 2015/0170049 A1 | 6/2015 | Mann et al. |
| 2015/0213021 A1 | 7/2015 | He et al. |
| 2015/0229531 A1 | 8/2015 | O'Sullivan et al. |
| 2015/0242906 A1 | 8/2015 | Liu et al. |
| 2015/0254785 A1 | 9/2015 | Yang et al. |
| 2015/0278241 A1 | 10/2015 | Bates-Haus et al. |
| 2015/0317197 A1 | 11/2015 | Blair |
| 2015/0324367 A1 | 11/2015 | Aravamudan et al. |
| 2015/0324805 A1 | 11/2015 | Skiba et al. |
| 2015/0363481 A1 | 12/2015 | Haynes |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0062980 A1 | 3/2016 | Boguraev et al. |
| 2016/0078567 A1 | 3/2016 | Goldman et al. |
| 2016/0103833 A1 | 4/2016 | Sanders et al. |
| 2016/0147760 A1 | 5/2016 | N et al. |
| 2016/0148222 A1 | 5/2016 | Davar et al. |
| 2016/0148321 A1 | 5/2016 | Ciaramitaro et al. |
| 2016/0154856 A1 | 6/2016 | Olof-Ors et al. |
| 2016/0179816 A1 | 6/2016 | Glover |
| 2016/0180470 A1 | 6/2016 | Mascaro et al. |
| 2016/0188731 A1 | 6/2016 | Dai et al. |
| 2016/0189029 A1 | 6/2016 | Giffels et al. |
| 2016/0196497 A1 | 7/2016 | Allen et al. |
| 2016/0203523 A1 | 7/2016 | Spasojevic et al. |
| 2016/0217472 A1 | 7/2016 | Podgorny et al. |
| 2016/0247165 A1 | 8/2016 | Ryabchun et al. |
| 2016/0283491 A1 | 9/2016 | Lu et al. |
| 2016/0306846 A1 | 10/2016 | Adams, Jr. et al. |
| 2016/0371276 A1 | 12/2016 | Furtado et al. |
| 2017/0011352 A1 | 1/2017 | Jones-McFadden et al. |
| 2017/0017899 A1 | 1/2017 | Maor et al. |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0046623 A1 | 2/2017 | Murdock et al. |
| 2017/0053026 A1* | 2/2017 | Musuluri ............ G06F 16/951 |
| 2017/0124184 A1 | 5/2017 | Podgorny et al. |
| 2017/0213130 A1 | 7/2017 | Khatri et al. |
| 2017/0228459 A1 | 8/2017 | Wang et al. |

(56) References Cited

U.S. PATENT DOCUMENTS

| | | |
|---|---|---|
| 2017/0262529 A1 | 9/2017 | Chim et al. |
| 2017/0262900 A1 | 9/2017 | Ramachandran et al. |
| 2017/0270159 A1 | 9/2017 | Wang et al. |
| 2017/0308613 A1 | 10/2017 | Zhu et al. |
| 2017/0323233 A1 | 11/2017 | Bencke et al. |
| 2018/0032523 A1 | 2/2018 | Singhal et al. |
| 2018/0032607 A1 | 2/2018 | Singhal et al. |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2018/0121550 A1 | 5/2018 | Jeon et al. |
| 2018/0137203 A1 | 5/2018 | Hennekey et al. |
| 2018/0174055 A1 | 6/2018 | Tirumale et al. |
| 2018/0189292 A1* | 7/2018 | Grace, Jr. ............... G06F 16/93 |
| 2018/0196796 A1 | 7/2018 | Wu |
| 2018/0204106 A1 | 7/2018 | Beller et al. |
| 2018/0287968 A1 | 10/2018 | Koukoumidis et al. |
| 2018/0321951 A1 | 11/2018 | Fitzgerald et al. |
| 2019/0018692 A1 | 1/2019 | Indyk et al. |
| 2019/0065576 A1 | 2/2019 | Peng et al. |
| 2019/0103035 A1 | 4/2019 | Beller et al. |
| 2020/0027095 A1 | 1/2020 | Cannon et al. |
| 2020/0134635 A1 | 4/2020 | Podgorny et al. |
| 2020/0134738 A1 | 4/2020 | Goodyear et al. |

FOREIGN PATENT DOCUMENTS

| | | |
|---|---|---|
| EP | 2159715 | 3/2010 |
| JP | 2014112316 | 6/2014 |
| WO | 2001082202 A2 | 11/2001 |
| WO | WO 2011/053830 | 5/2011 |

OTHER PUBLICATIONS

Steyvers, Mark, et al. "Probabilistic Author-Topic Models for Information Discovery;" KDD'04, Aug. 22-25, 2004.

Mimno, David, et al., "Sparse Stochastic Inference for Latent Dirichlet Allocation," Proceedings of the 29th International Conference on Machine Learning, Edinburgh, Scotland, UK, 2012.

Blei, David M., "Probabilistic Topic Models," Communications of the ACM, Apr. 2012, vol. 55, No. 4, pp. 77-84.

Grant, Sheryl, et al., "The Human Face of Crowdsourcing: A Citizen-led Crowdsourcing Case Study;" 2013 IEEE International Conference on Big Data, Silicon Valley, CA, 2013, pp. 21-24.

Encyclopedia Britannica, "Graphical User Interface (GUI);" Sep. 5, 2015. Retrieved from the internet <URL: https://www.britannica.com/technology/graphical-user-interface>.

Wikipedia, "Widget (GUI)," Sep. 7, 2016. Retrieved from the internet <URL: https://en.wikipedia.org/w/index.php?title=Widget_(GUI)&oldid=738206274>.

The Scientific Marketer, "Uplift Modelling FAQ", article date of Sep. 27, 2007, retrieved from http://scientificmarketer.com/2007/09/uplift-modelling-faq.html (Year: 2007).

Zadeh, Z.; "Probabilistic Modeling in Community-Based Question Answering Services," Dalhousie University, Halifax, Nova Scotia; Feb. 2012.

Podgorny, et al., "Content Quality and User Ranking in TurboTax AnswerXchange," Proceedings of the European Conference on Social Media, University of Brighton UK, Jul. 10-11, 2014.

Podgorny, et al. "Real Time Detection and Intervention of Poorly Phrased Questions," CHI EA '15, Proceedings of the $33^{rd}$ Annual ACM Conference Extended Abstracts on Human Factors in Computing Systems, Apr. 18-23, 2015, Seoul, Republic of Korea, pp. 2205-2210.

Bartolome et al., "Processing Unstructured Voice of Customer Feedback for Improving Content Rankings in Customer Support Systems," U.S. Appl. No. 15/094,653, filed Apr. 8, 2016.

Get Satisfaction [online]. Sprinklr, 2017 [retrieved on Nov. 22, 2017]. Retrieved from the Internet: <URL: https://getsatisfaction.com/corp>.

Dror, et al., "From Query to Question in One Click: Suggesting Synthetic Questions to Searchers," International World Wide Web Conferences Steering Committee, May 13, 2013, pp. 391-401.

Fitchett et al., "An Empirical Characterisation of File Retrieval," Oct. 3, 2014, University of Canterbury, Christchurch, New Zealand, Int. J. Human-Computer Studies 74 (2015), pp. 1-13 (Year: 2014).

Han et al., "Understanding and Supporting Cross-Device Web Search for Exploratory Tasks with Mobile Touch Interactions," Apr. 2015, ACM Transactions on Information System, vol. 33, No. 4, pp. 1-35, (Year: 2015).

Kumar et al., "Personalized Web search Using Browsing History and Domain Knowledge" International Conference on Issues and Challenges in Intelligent Computing Techniques (ICICT), IEEE 2014, pp. 493-497.

Wen et al., "Clustering user Queries of a Search Engine," Proceedings of the 10th International Conference on World Wide Web, pp. 162-168, ACM, 2001 (Year: 2001).

Ponzanelli et al., "Understanding and Classifying the Quality of Technical Forum Questions," IEEE, 14th International Conference on Quality Software, pp. 343-352 (Year: 2014).

Wikipedia, "Incremental Search," Jul. 22, 2016. Retrieved from the internet on Mar. 11, 2020 <URL: https://en.wikipedia.org/w/index.php?title=incremental_search&oldid=731052532>, 5 pages (Year 2016).

Negoescu et al., "Modeling Flickr Communities Through Probabilistic Topic-Based Analysis," IEEE Transactions on Multimedia, vol. 12, No. 5, pp. 399-416, Aug. 2010.

* cited by examiner

200

Searching: "how to enter multiple w2"

Filter results

202 — how to file multiple w2's
  ✓ From the answer: If you've already entered one and need to get back there to enter an additional W2, you can get there by the following steps: Log in to TurboTax Online and click Continue to to open your return (if it is not already open) Click on Federal Taxes , so — 204

202 — How do I handle multiple W-2s from the same employer?
  ✓ From the answer: Enter all the info from the most complete W-2, then enter the different state and local info from the other W-2. — 204

202 — Where do I add or enter a second W-2?
  ✓ From the answer: If accepted (or if you already paper-filed), you'll need to amend your return to add another W-2... How do I import or enter my W-2? — 204

202 — Multiple entries in Box 18, 19 and 20 of W2; how to enter
  ✓ From the answer: When you are entering your W-2 Boxes 18 - 20, you should see the option to Add Another Row under where you enter your information. — 204

202 — How do I upload multiple W-2 forms?
  ✓ From the answer: Click Federal Taxes heading Click Wages and Income . If it doesn't default to it. Under All Income , the top section will be Wages and Salaries . Click the show more Click the revisit button You will get to a screen that says 'Here's Your W-2 ) — 204

FIG. 2

METHOD AND SYSTEM FOR PROVIDING REAL TIME SEARCH PREVIEW PERSONALIZATION IN DATA MANAGEMENT SYSTEMS

CROSS REFERENCE TO RELATED APPLICATION

The present application is a continuation in part of U.S. patent application Ser. No. 15/650,236, filed Jul. 14, 2017, having INTU1710353, titled "System and Method for Identifying and Providing Personalized Self-Help Content with Artificial Intelligence in A Customer Self-Help System". U.S. patent application Ser. No. 15/650,236 is incorporated herein by reference in its entirety.

BACKGROUND

Users of data management systems often develop questions regarding data management topics or regarding features of the data management systems. Accordingly, many traditional data management systems provide self-help functionality that enables users to obtain help related to various topics while using the data management systems. In particular, users can enter search queries into a search field and receive links to various assistance documents in response to the search queries. Users can then select assistance documents from among the search results. In this way, traditional data management systems enable users to obtain assistance in using the services of the data management systems.

However, traditional data management systems fail to present search results to users in a manner that enables users to quickly and accurately identify assistance documents that are likely to include the answers to the users' questions. For example, many traditional data management systems provide search results as a series of titles of assistance documents. Users quickly scan the titles and only select an assistance document if a brief scan of the title indicates that the assistance document is likely directly related to the users' questions. If a title does not immediately strike a user as being relevant, the user will not select the title.

Additionally, some traditional data management systems provide search results that include the title and a small sample or preview of the contents of the assistant document. Users typically briefly scan these previews for particular words or phrases. If the users do not see an expected word or phrase in the preview, then the user will not select the corresponding assistance document. Thus, even when traditional data management systems provide search results that include assistance documents that directly answer the users' questions, the users do not recognize the relevance of the assistance documents.

If users are not able to quickly find answers to their questions, users are highly likely to seek assistance by calling customer support, by initiating a live chat, or by sending an email. The cumulative cost of resolving users' questions via these methods is very large. Additionally, some users may continue entering additional search queries, thereby causing the data management systems to spend large amounts of computing resources in performing additional fruitless searches for assistance topics that will help the users. Other users may become frustrated and abandon the data management systems.

All of these drawbacks are a result of the technical inability of the traditional data management systems to present search results in a manner that enables individual users to correctly identify whether assistance documents likely contain the answers to the users' questions. Accordingly, there exists a technical problem of presenting personalized search results dynamically tailored to the needs of individual users in real time. What is needed is a system and method that can provide a technical solution to the technical problem of presenting personalized search results that are dynamically tailored to individual users in real time.

SUMMARY

Embodiments of the present disclosure provide one or more technical solutions to the technical problem of presenting personalized search results that are dynamically tailored to individual users in real time. Embodiments of the present disclosure receive a search query from a user and identify a number of assistance documents likely to be relevant to the user. Embodiments of the present disclosure utilize natural language processing and machine learning techniques to generate, in real time, a personalized preview of each assistance document. The personalized preview includes words and phrases selected based on the style of language and the attributes of the user in accordance with the natural language processing and machine learning techniques. Embodiments of the present disclosure present to the user the search results including the personalized preview of each assistance document. The personalized previews enable the user to quickly and accurately determine if the corresponding assistance documents are likely to answer the user's question.

Embodiments of the present disclosure address some of the shortcomings associated with traditional data management systems. A data management system in accordance with embodiments of the present disclosure utilizes natural language processing and machine learning processes in order to provide personalized search results to users in real time. The various embodiments of the disclosure can be implemented to improve the technical fields of electronic data management, data processing, data transmission, and data storage. Therefore, the various described embodiments of the disclosure and their associated benefits amount to significantly more than an abstract idea. In particular, by providing accurate and personalized assistance to users, electronic data management is significantly improved.

BRIEF DESCRIPTION OF THE DRAWINGS

FIG. 2 is an illustration of search results provided to a user of a data management system, in accordance with one embodiment.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

Using the disclosed embodiments of a method and system for providing personalized search results to users of a data management system, a method and system for providing personalized search results to users of a data management system more accurately is provided. Therefore, the disclosed embodiments provide a technical solution to the long standing technical problem of presenting search results to users in a manner that enables users to quickly ascertain the relevance of the search results The disclosed embodiments of a method and system for providing personalized search results to users of a data management system are also capable of dynamically adapting to constantly changing fields such as data management systems. Consequently, the disclosed embodiments of a method and system for providing personalized search results to users of a data management system also provide a technical solution to the long standing technical problem of static and inflexible data management systems.

The result is a much more accurate, adaptable, and robust method and system for providing personalized search results to users of a data management system. This, in turn, results in less human and processor resources being dedicated to assisting users to answer their questions regarding data management systems. Thus, embodiments of the present disclosure lead to the usage of fewer processing resources, usage of fewer memory storage assets, and less communication bandwidth being utilized to transmit data for analysis.

The disclosed method and system for providing personalized search results to users of a data management system does not encompass, embody, or preclude other forms of innovation in the area of data management. In addition, the disclosed method and system for providing personalized search results to users of a data management system is not related to any fundamental economic practice, fundamental data processing practice, mental steps, or pen and paper-based solutions, and is, in fact, directed to providing solutions to new and existing problems associated with data management systems. Consequently, the disclosed method and system for providing personalized search results to users of a data management system, does not encompass, and is not merely, an abstract idea or concept.

Figure 1:
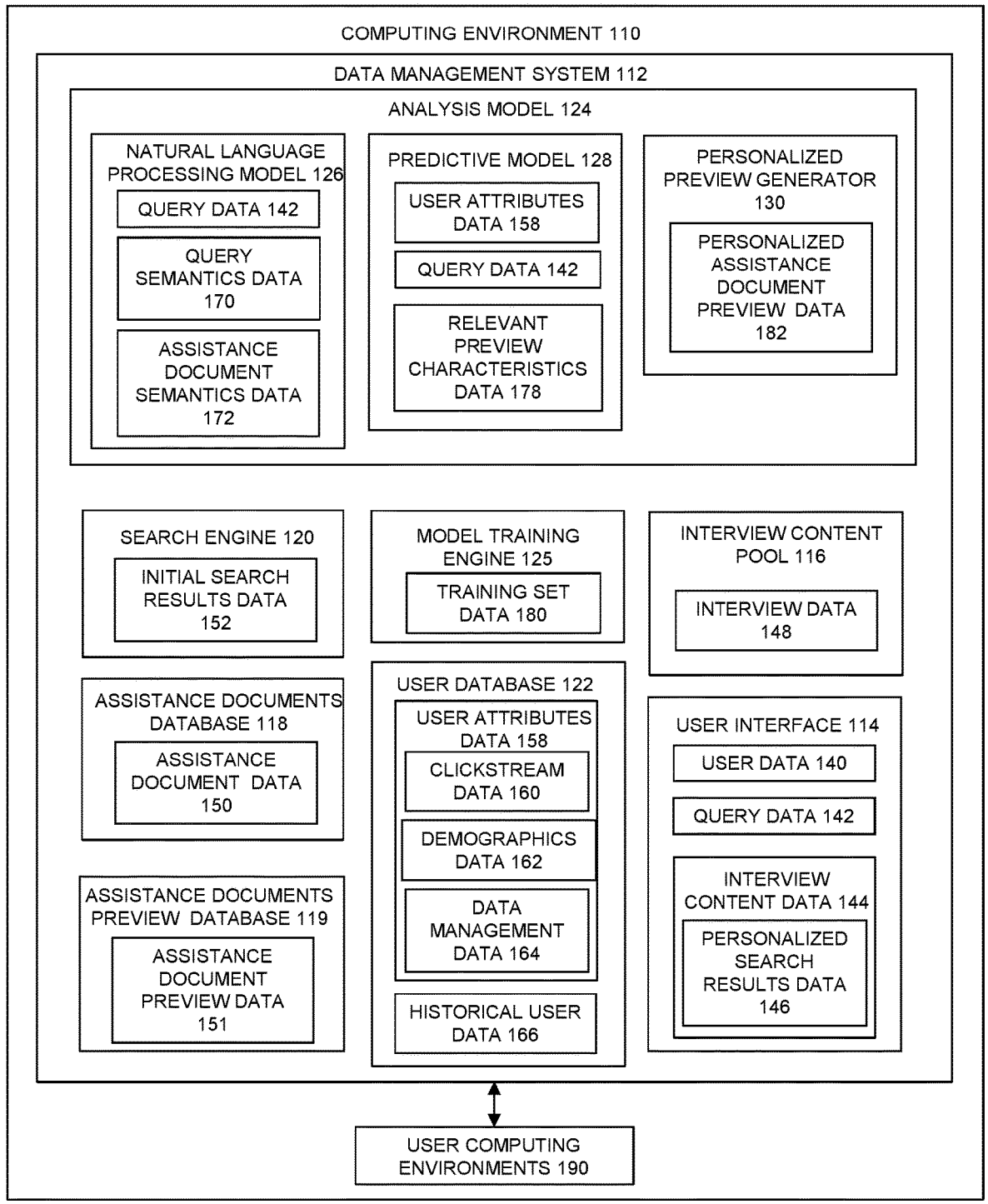
FIG. 1 is a block diagram of software architecture for providing personalized search results to users of a data management system, in accordance with one embodiment.

FIG. 1 illustrates a block diagram of a production environment 100 for providing personalized search results to users of a data management system, according to one embodiment. Embodiments of the present disclosure provide data management interview content data to a user of a data management system as part of a data management interview. The data management system receives query data from the user corresponding to a request for assistance related to the data management system. The data management system generates initial search results data indicating a plurality of assistance documents likely to be relevant to the request based on the query data. The data management system generates, for each assistance document included in the initial search results data, personalized assistance document preview data including a preview of the assistance document personalized for the user based on attributes of the user. The data management system generates personalized search results data listing the assistance documents and including the personalized assistance document preview data. The data management system outputs the personalized search results data to the user.

The disclosed method and system for providing personalized search results to users of a data management system provides for significant improvements to the technical fields of data management, data processing, and data transmission.

In addition, the disclosed method and system for providing personalized search results to users of a data management system provides for the processing and storage of smaller amounts of data related to providing assistance to the users. Because assistance topic preview is personalized in such a way that users can readily determine their true relevance, fewer system resources are devoted to performing additional searches based on inadequate initial search results. Consequently, using the disclosed method and system for providing personalized search results to users of a data management system results in more efficient use of human and non-human resources, fewer processor cycles being utilized, reduced memory utilization, and less communications bandwidth being utilized to relay data to, and from, backend systems and client systems, and various systems and parties. As a result, computing systems are transformed into faster, more efficient, and more effective computing systems by implementing the method and system for providing personalized search results to users of a data management system.

As seen in FIG. 1, the production environment 100 includes a computing environment 110. The computing environment 110 represents one or more computing systems such as a server, and/or distribution center that is configured to receive, execute, and host one or more data storage and access systems, according to one embodiment. The computing environment 110 represents a traditional data center computing environment, a virtual asset computing environment (e.g., a cloud computing environment), or a hybrid between a traditional data center computing environment and a virtual asset computing environment, according to various embodiments.

In one embodiment, the computing environment 110 includes a data management system 112. The data management system 112 can include a user interface 114, an interview content pool 116, an assistance documents database 118, an assistance documents preview database 119, a search engine 120, a user database 122, an analysis model 124, and a model training engine 125, according to various embodiments. The analysis model 124 can include a natural language processing model 126, a predictive model 128, and a personalized preview generator 130, according to various embodiments.

In one embodiment, the data management system 112 is an electronic data management system that assists users to manage their data. In one embodiment, the data management system 112 is a financial management system. The financial management system can include one or more of a tax return preparation system, a bookkeeping system, an accounting system, and a financial transaction monitoring system, according to various embodiments. Users provide their financial data to the financial management system and the financial management system provides financial management services to the users.

In one embodiment, the data management system 112 utilizes the user interface 114 to enable the users of the data management system 112 to interact with the data management system 112. The user interface 114 enables users to access the data management services of the data management system 112. The user interface 114 enables users to provide data and instructions to the data management system 112. The user interface 114 enables the data management system 112 to provide data to the users in conjunction with the data management services provided by the data management system 112.

In one embodiment, the user interface 114 enables the data management system 112 to interface with user computing environments 190. The user computing environments 190 include computing environments utilized by users of the data management system 112. The user computing environments include one or more of desktop computing devices, mobile phone computing devices, tablet computing devices, laptop computing devices, and cloud-based computing devices. The user computing environments 190 include computing environments utilized by users of the data management system 112 to access the data management services of the data management system 112. The user computing environments 190 access the data management system 112 via the user interface 114 in order to provide data to the data management system 112 and to receive data from the data management system 112.

In one embodiment, one or more components of the data management system 112, or portions of one or more components of the data management system 112, are implemented in the user computing environments 190. Thus, in one embodiment, some of the processing, software, and memory resources associated with functionality of the data management system 112 are implemented in the user computing environments 190.

In one embodiment, users of the data management system 112 receive a data management interview from the data management system 112 via the user interface 114. Users provide user data 140 to the data management system 112 via the user interface 114. The data management system 112 provides interview content data 144 to the users via the user interface 114. The user data 140 can include personal information related to the user, demographics data related to the user, and data that the user wishes to be managed by the data management system 112. The user may provide user data 140 in response to questions posed by the data management system 112 during the data management interview. In an example in which the data management system 112 is a financial management system, the user data 140 can include financial data of the user related to the financial management services provided by the financial management system.

In one embodiment, the data management system 112 includes an interview content pool 116. The interview content pool 116 includes interview data 148. The interview data 148 guides a user through a series of data management topics, asks questions, and invites the user to provide data related to data management topics and questions. The user interface 114 populates the interview content data 144 from the interview data 148. The interview content pool 116 includes topics, questions, and user experience elements that can be presented to the user during the data management interview.

In one embodiment, the interview data 148 includes a large number of data management interview pages which can be presented to the users with the interview content data 144 as part of the data management interview. The users can make selections to navigate through the various interview pages during the data management interview. In one embodiment, the interview data 148 associates with each interview page, a respective identification number. In one embodiment, the interview data 148 associates various data management topics with each interview page in accordance with the content of each interview page.

In one embodiment, the data management system 112 includes a user database 122. The user database 122 includes user attributes data 158 associated with each user of the data management system 112. The user attributes data 158 includes the various kinds of data collected by the data management system 112 related to the users.

In one embodiment, the user attributes data 158 includes clickstream data 160. The clickstream data 160 indicates how the user has progressed through the data management interview. The clickstream data 160 can include data indicating which data management pages the user has accessed during the data management interview. The clickstream data 160 can include a list of identification numbers for each data management page that the user has accessed. In one embodiment, the clickstream data 160 can include data indicating how long a user remained on each data management page, selections made by the user in the various interview pages, advertisements to which the user was exposed, advertisements that the user investigated, which interview pages the user has most recently visited, assistance topics accessed by the user, and other behavioral data indicating actions that the user undertook in relation to the data management interview.

In one embodiment, the user attributes data 158 includes demographics data 162. The demographics data 162 includes data indicating the demographics of each user. In one embodiment, the demographics data 162 includes, for each user, an age range of the user, a gender of the user, a geolocation of the user, marital status information of the user, parental information of the user, and other kinds of personal demographics data related to the user.

In one embodiment, the user attributes data 158 includes data management data 164. The data management data 164 includes data received from the user, or related to the user, for data management purposes. In an example in which the data management system 112 is a tax return preparation system, the data management data 164 can include tax related data provided by the user, such as W-2 information, income information, investment information, charitable donations, work-related deductions, and other kinds of tax related data that can be collected from the user or related to a user for purposes of preparing a tax return for the user. Accordingly, the data management data 164 includes the type of data provided by the user for receiving data management services from the data management system 112. In one embodiment, there is overlap between the data management data 164 and the demographics data 162 such that the data management data 164 can include demographics data related to the user.

In one embodiment, the user database 122 includes historical user data 166. The historical user data 166 includes data management data associated with historical users of the data management system 112. The historical user data 166 can include the same types of data included in the user attributes data 158 for historical users of the data management system 112. In one embodiment, the historical user data 166 includes data related to current users of the data management system 112.

In one embodiment, the data management system 112 includes an assistance documents database 118. The assistance documents database 118 includes assistance document data 150. In one embodiment, the assistance document data 150 includes a plurality of assistance documents. The assistance documents include assistance topics as well as solutions to problems related to the assistance topics. Each assistance document corresponds to an assistance topic with one or more solutions or answers related to the assistance topic.

In one embodiment, the assistance documents database 118 is a social question-and-answer database. In a social question-and-answer database, each assistance document corresponds to a question or query provided by a user of the data management system 112. In the social question answer database, the answers or solutions to a query made by a user are provided by other users of the data management system 112. A single assistance document can include multiple answers or solutions provided by various users of the social question-and-answer support system.

In one embodiment, an assistance document includes answers provided by regular users of the data management system 112, or by users that have been designated as trusted users of the data management system 112. Furthermore, in one embodiment, an assistance document includes answers provided by experts or other personnel associated with the data management system 112.

In one embodiment, each assistance document includes feedback data based on feedback provided by users of the data management system 112 that have viewed the assistance document. In one embodiment, the assistance document includes functionality that enables users of the data management system 112 to provide feedback related to the query associated with the assistance document and related to the answers provided by the various users of the data management system 112 that have accessed the assistance document. For example, users of the data management system 112 that access an assistance document may be invited to identify, for each answer provided, whether the answer was helpful or unhelpful. Thus, each answer can have both positive and negative feedback from users of the data management system that have viewed the assistance document associated with the answers. In one embodiment, the feedback data includes feedback for the query and feedback for the answers. In one embodiment, the feedback for each item in the assistance document includes positive feedback such as a thumbs-up, a confirmation that the question or answer was helpful, or other kinds of positive feedback. In one embodiment, the feedback for each item in the assistance document includes negative feedback such as a thumb down or an assertion that the answer was unhelpful. Feedback can include structured feedback such as up or down votes, starts, etc. Feedback can also include unstructured feedback such as text comments added by the users in addition to the votes to give the rationale for the votes.

In one embodiment, each assistance document from the assistance document data includes a query. The query corresponds to the search query provided by the user that originally generated the assistance document. The query can include a question, a full statement, or one or more search terms. Thus, the query can include full sentences, sentence fragments, or even an individual word or two. Furthermore, sentences can be grammatically correct or incorrect, can include or not include punctuation marks, can be well formulated or poorly formulated, or have other characteristics that may differentiate assistance documents in terms of quality or intent.

In one embodiment, each assistance document from the assistance document data 150 includes answer data. The answer data includes the answers or solutions provided by users, trusted users, or personnel associated with the data management system 112. An assistance document may include a single answer, multiple answers, or no answer at all. An assistance document can also include optional comments. In addition, an assistance document may have a comment, but no answers.

In one embodiment, the assistance documents preview database 119 includes assistance document preview data 151 corresponding to assistance document previews. The assistance document preview data 151 includes, for each assistance document in the assistance documents database 118, multiple previously generated assistance document previews. The multiple previously generated assistance document previews included in the assistance documents preview database 119 can be utilized for providing personalized search results data 146 to a user, as will be set forth in more detail below.

In one embodiment, users of the data management system 112 can provide query data 142 to the data management system 112. The query data 142 corresponds to a query from the user for assistance from the data management system 112 related to one or more aspects of the data management system 112. The query data 142 can include one or more search terms. When a user of the data management system 112 provides query data 142, the data management system 112 provides personalized search results data 146 to the user in response to the query. Accordingly, the data management system 112 enables users to provide queries and to receive personalized assistance in response to the queries, as will be set forth in more detail below.

In one embodiment, the data management system 112 includes a search engine 120 to assist in providing personalized search results data 146 to users in response to receiving query data 142 from the users. In particular, when the user provides query data 142, the search engine 120 performs a search of the assistance documents database 118 in order to identify assistance documents that are relevant to the query data 142. As will be set forth in more detail below, in one embodiment, the search engine 120 cooperates with the analysis model 124 to identify assistance documents that are relevant to the user based on the user attributes data 158 and the query data 142.

In one embodiment, the search engine 120 generates initial search results data 152 in response to the query data 142 and in cooperation with the analysis model 124. In one embodiment, the initial search results data 152 includes a series of assistance documents selected from the assistance documents database 118. The initial search results data 152 includes assistance documents that are most likely to be relevant to the user based on the query data 142 and the user attributes data 158.

In one embodiment, the data management system 112 includes multiple search engines 120. Each search engine 120 can be specialized to search for assistance documents that correspond to particular assistance topics, as will be set forth in more detail below. Generating the personalized search results data 146 can include selecting, with the analysis model 124, a search engine 120 based on the user attributes data 158 and the query data 142. In one embodiment, the multiple search engines may include multiple search rankers. Each search ranker is trained on the data collected for a particular sub-domain.

When search results including a list of assistance documents are presented to users, users do not typically read every word in the title or in the preview of each assistance document. Furthermore, users do not typically examine the title or the preview by reading from left to right and from top to bottom as would be expected when people read in other situations. Instead, users often read only a few words from scattered locations in the preview and the title. Typically, users are looking for particular words or phrases in order to determine if the assistance document is likely to answer the question. The inventors have observed, based on eye-tracking research, that users may examine assistance document previews in a variety of ways. Some users look to see if the first words match words from the query. Some users look to see if the type of question posed in the assistance document matches the type of question posed in the query. Some users read the entire assistance document preview.

Accordingly, in order to increase the likelihood that a user will click on the right assistance document from the initial search results data 152, the data management system 112 utilizes the analysis model 124 to generate personalized assistance document preview data 182. When the initial search results contain an assistance document that is highly likely to answer the user's question, the analysis model 124 generates personalized assistance document preview data 182 that includes a personalized preview of the assistance document that is highly likely to answer the user's question. The personalized assistance document preview data 182 is generated to include characteristics that increase the likelihood that the user will select the assistance document and proceed to examine the entire assistance document. The characteristics of the personalized assistance document preview data 182 are selected based on the user attributes data 158 and the query data 142.

In one embodiment, the analysis model 124 utilizes the natural language processing model 126 in order to generate personalized assistance document preview data 182. The natural language processing model 126 analyzes the query data 142 and generates query semantics data 170. The query semantics data 170 identifies semantic features of the query data 142 based on the analysis of the natural language processing model 126. The analysis model 124 can utilize the query semantics data 170 to generate personalized assistance document preview data 182 that includes a preview of the assistance document based on the query semantics data 170 related to the query data 142.

In one embodiment, the natural language processing model 126 is trained to identify what type of query is reflected in the query data 142. The natural language processing model 126 is configured to identify whether the query data 142 includes an open-ended question that cannot be answered with a "yes" or "no". The natural language processing model 126 is configured to identify whether the query data 142 includes a closed ended the question that can be answered with "yes" or "no". The natural language processing model 126 is configured to identify whether the query data 142 does not include a specific statement, but merely a topic or multiple topics. The natural language processing model 126 generates the query semantics data 170 to indicate these characteristics of the query.

In one embodiment, the analysis model 124 utilizes the natural language processing model 126 to assist in generating personalized assistance document preview data 182 that includes one or more portions that match the semantics of the query data 142 as reflected in the query semantics data 170. Many users are more likely to select an assistance topic if the preview includes semantics that match the semantics of the query data 142. Indeed, in many cases, users scan assistance document previews in search of specific words or phrases from their own query. If the user immediately notices that the preview includes the specific words or phrases from the query, or if the preview includes semantics that otherwise match the query, then the user is much more likely to select the assistance document. Accordingly, the analysis model 124 utilizes the query semantics data 170 to generate personalized assistance document preview data 182 based on the query semantics data 170.

In one example, the query data 142 includes the partial phrase "How can I". The natural language processing model 126 generates query semantics data 170 that identifies the presence of an open-ended question with this phraseology. The analysis model 124 generates personalized assistance document preview data 182 that includes a preview beginning with the same phrase "How can I" from the query data 142. When the user scans the personalized search results data 146, the user is much more likely to notice the same phrase "How can I" in the personalized assistance document preview data 182 associated with an assistance document and to select the assistance document.

In one example, the query data 142 includes the phrase "Can I". The natural language processing model 126 generates query semantics data 170 indicating the presence of a closed ended question. The analysis model 124 generates personalized assistance document preview data 182 that begins with the phrase "Can I". When the user scans the personalized search results data 146 the user is much more likely to notice the same phrase "Can I" in the personalized assistance document preview data 182 associated with an assistance document and to select the assistance document. Alternatively, in one example, the analysis model 124 generates personalized assistance document preview data 182 that begins with "yes you can" or "no you cannot". The user may immediately notice the direct answer to the user's query and is more likely to select the assistance document.

In one embodiment, the natural language processing model 126 generates assistance document semantics data 172 by analyzing the assistance document. When the initial search results data 152 includes an assistance document that is highly likely to answer the question included in the query data 142, or to provide the information that is highly relevant to the query data 142, the natural language processing model analyzes the assistance document and generates assistance document semantics data 172. The assistance document semantics data 172 identifies semantic characteristics of the assistance document. The assistance document semantics data 172 can include indications of portions of the assistance document that are semantically similar to the query data 142.

In one embodiment, the analysis model 124 utilizes the assistance document semantics data 172 and the query semantics data 170 to generate personalized assistance document preview data 182. The analysis model 124 can generate the personalized assistance document preview data 182 for the assistance document by selecting, for inclusion in the personalized assistance document preview data 182, portions of the assistance document that are semantically similar to the query data 142 based on the assistance document semantics data 172 and the query semantics data 170.

In one embodiment, the analysis model 124 utilizes the assistance document semantics data 172 to generate personalized assistance document preview data 182 by substituting words or phrases from the query data 142 into portions of the of portions of the assistance document that do not identically match the words or phrases from the query data 142, but that have the same meaning as the words or phrases from the query data 142. For example, if the query data 142 includes the phrase "file with my wife" and the assistance document includes the phrase "file jointly", the assistance document semantics data 172 indicates that the phrase "file jointly" is equivalent to the phrase "file with my wife". The analysis model 124 may select for the personalized preview a portion of the assistance document that includes the phrase "file jointly". However, in the personalized assistance document preview data 182, the analysis model 124 replaces "file jointly" with "file with my wife". This can increase the likelihood that the user will select the assistance document. Thus, the natural language processing model 126 can identify portions of the assistance document that are equivalent, but not identical, to portions of the query data 142. The analysis model 124 can then generate personalized assistance document preview data 182 based on the identification of these equivalent phrases in the query data 142 and the highly relevant assistance document identified in the initial search results data 152.

In one embodiment, the analysis model 124 includes a word clustering algorithm to generate the query semantics data 170 and the assistance document semantics data 172. In one embodiment, the natural language processing model 126 uses a Word2vec, Doc2vec, or Sentence2vec model to generate vectorization data by converting each word from the query data 142 and the highly relevant assistance document into vectors. In one embodiment, the vectorization data includes word embeddings. In one embodiment, the Word2vec model includes a two-layer neural network. The two-layer neural network is trained to reconstruct the linguistic context of words. The vectors are generated such that description terms that appear in common contexts are located in close proximity to one another in the vector space. In this way, the natural language processing model 126 can use the vector representations of the terms from the query data 142 and the terms from the assistance document in order to identify semantically similar portions of the assistance document and the query data 142. The analysis model 124 can then generate personalized assistance document preview data 182 based on the semantically similar portions of the assistance document in the query data 142 as identified with the vector representations, according to one embodiment.

In one embodiment, the analysis model 124 utilizes the predictive model 128 to assist in generating the personalized assistance document preview data 182. The predictive model 128 identifies characteristics of an assistance document preview that are likely to be relevant to the user based on the user attributes data 158, the query data 142, and the historical user data 166. The analysis model 124 then utilizes the identified characteristics in order to generate personalized assistance document preview data 182 that is likely to enable the user to quickly identify that the assistance document is relevant to the user so that the user may select the assistance document.

In one embodiment, the data management system 112 utilizes a model training engine 125 in order to train the analysis model 124. In particular, the model training engine 125 can train the analysis model 124 in accordance with one or more machine learning processes. The one or more machine learning processes train the analysis model 124 to generate personalized assistance document preview data.

In one embodiment, model training engine 125 trains the predictive model 128 with a supervised machine learning process. The model training engine 125 utilizes training set data 180 to train the predictive model 128. The training set data 180 includes portions of the historical user data 166. The training set data 180 includes data identifying the characteristics of large number of previously utilized assistance document previews. The training set data 180 includes data indicating how historical users of the data management system 112 selected assistance documents when presented with the assistance document previews. The training set data 180 also includes historical user attributes data identifying the attributes of the historical users. The historical user attributes data includes clickstream data indicating how historical users navigated through the services of the data management system and selected among assistance documents. The historical user attributes data includes historical query data entered by historical users seeking assistance related to the data management system 112. The historical user attributes data includes demographics data indicating the demographics of the historical users. The historical user attributes data also includes data management data identifying characteristics of the data managed by the data management system related to the historical users. The model training engine 125 utilizes the training set data 180 to train the predictive model 128 to identify relevant preview characteristics data 178.

In one embodiment, the training set data 180 indicates that certain kinds of users click on certain kinds of assistance document previews. The model training engine 125 utilizes the training set data 180 to train the predictive model 128 to correctly predict how users select among the assistance document previews based on the attributes of the users and the characteristics of the assistance document previews.

In one embodiment, during the machine learning process, the model training engine 125 uses, as input, the characteristics of the historical users including clickstream data demographics data management data. During the machine learning process predictive model 128 predicts whether the historical users would select the assistance document previews based on the characteristics of the assistance document previews. The predictive model 128 includes various mathematical functions that cause the predictive model 128 to match the historical users to the assistance document previews based on the characteristics of the assistance document previews and the attributes of the historical users. The model training engine 125 iteratively adjusts these functions and checks the accuracy of the predictive model 128 and matching historical users to assistance document previews. This process continues until the model training engine 125 can reliably match historical users to the correct assistance document previews. In this way the model training engine 125 trains the predictive model 128 to identify the characteristics of an assistance document preview that is likely to be selected by the user based on the attributes of the user.

In one embodiment, the predictive model 128 includes a Latent Dirichlet Allocation (LDA) model. In one embodiment, the predictive model 128 includes a naïve Bayes model. In one embodiment, the predictive model 128 includes logistic regression model. In one embodiment, the predictive model 128 includes a random forest model. In one embodiment, the predictive model includes a linear regression model. In one embodiment, the predictive model includes a linear discriminant model. In one embodiment, the predictive model includes a neural networks model. In one embodiment, the predictive model 128 includes a support vector machines model. In one embodiment, the predictive model includes a decision tree model. In one embodiment, the predictive model 128 includes a K nearest neighbors model. Additionally, or alternatively, the predictive model 128 can utilize other types of models or algorithms.

In one embodiment, the predictive model 128, or other models included in the analysis model 124, are trained in accordance with a deep learning unsupervised machine learning process to identify assistance topics that are likely to be relevant to query data 142 provided by the user based on vector representations or vectorized representations of the terms included in the query data 142 and terms associated with the user attributes data 158. In particular, the predictive model 128 adds, to query data 142, terms based on the user attributes data 158 and converts the combined terms into numerical vectors. The predictive model 128 performs one or more vector clustering algorithms on the vectors representing the combination of terms in order to identify assistance topics that are likely to be relevant to the combination of terms.

In one embodiment, when the user enters query data 142, the predictive model 128 receives the query data 142 and the user attributes data 158 associated with the user. The user attributes data 158 can include clickstream data 160, demographics data 162, and data management data 164. The predictive model 128 analyzes the query data 142 and the user attributes data 158 in order to generate relevant preview characteristics data 178. The relevant preview characteristics data 178 identifies the characteristics of an assistance document previews that are likely to be relevant to the user based on the user attributes data 158 and the query data 142.

In one embodiment, the analysis model 124 utilizes the relevant preview characteristics data 178 produced by the predictive model 128 in order to generate personalized assistance document preview data 182 that is likely to be identified by the user as being relevant to the query data 142 provided by the user. In one embodiment, after the relevant preview characteristics data 178 has been generated by the predictive model 128, the analysis model 124 generates personalized assistance document preview data 182 including a preview of the assistance document that is personalized based on the attributes of the user.

In one example, a user provides query data 142 to the data management system. The data management system identifies multiple assistance documents relevant to the query. The predictive model analysis the user attributes data 158 and generates relevant preview characteristics data 178 indicating that the user is likely to select an assistance document that includes an image or a video. The analysis model 124 generates personalized assistance document preview data 182 for an assistance document that includes a video. The personalized assistance document preview data includes an icon indicating the presence of an explanatory image or video. The user is likely to select this assistance document from the personalized search results data 146.

In one embodiment, the analysis model 124 generates personalized assistance document preview data 182 based on analysis from the natural language processing model 126 and the predictive model 128. In particular, when a user provides query data 142, the natural language processing model 126 generates query semantics data 170 and assistance document semantic data 172. The predictive model 128 generates relevant preview characteristics data 178. The analysis model 124 generates personalized assistance document preview data 182 based on the query semantics data 170, the assistance document semantic data 172, and the relevant preview characteristics data 178.

In one embodiment, the analysis model 124 generates the personalized assistance document preview data 182 based on analysis from only one of the predictive model 128 and the natural language processing model 126. If one of the natural language processing model 126 and the predictive model 128 produce analysis data that does not strongly indicate how to produce personalized assistance document preview data 182, then the analysis model 124 can use the analysis based on the other model.

In one embodiment, the analysis model 124 generates personalized assistance document preview data 182 by generating new personalized assistance document preview data 182 in real time when query data 142 is provided to the data management system 112. Thus, in one embodiment, when query data 142 is received, the analysis model 124 generates entirely new personalized assistance document preview data 182 for an assistance document based on analysis of the natural language processing model 126 order predictive model 128 in real time.

In one embodiment, the assistance documents preview database 119 includes assistance document preview data 151 corresponding to assistance document previews. The assistance document preview data 151 includes, for each assistance document in the assistance documents database 118, multiple previously generated assistance document previews. The multiple previously generated assistance document previews included in the assistance documents preview database 119 can be utilized for providing personalized search results data 146 as will be set forth in more detail below.

In one embodiment, the analysis model 124 generates personalized assistance document preview data 182 by selecting an assistance document preview from the assistance documents preview database 119. Because the assistance documents preview database includes, for each assistance document in the assistance documents database 118, multiple assistance document previews, the analysis model 124 can generate the personalized assistance document preview data 182 by selecting one of the assistance document previews based on the analysis provided by one or both of the natural language processing model 126 and the predictive model 128. Accordingly, generating personalized assistance document preview data 182 can include selecting from among multiple previously generated assistance document previews, in one embodiment.

In one embodiment, when the search engine 120 returns initial search results data 152, the analysis model 124 generates personalized assistance document preview data 182 for each assistance document identified in the initial search results data 152. In one example, the initial search results data 152 includes eight assistance documents to be presented on a first search results page. The analysis model 124 generates personalized assistance document preview data 182 including a personalized preview for each assistance document to be presented on the first search results page. The user interface 114 then presents the personalized search results data 146 including the personalized assistance document preview for each assistance document. In one embodiment, if the user selects to navigate to the next page of search results, the analysis model 124 can analyze the assistance documents included in the next page of search results and to generate personalized assistance document preview data 182 in real time for the next page of search results.

In one embodiment, the analysis model 124 does not generate personalized assistance document preview data 182 for each assistance document included in the initial search results data 152. Instead, the analysis model 124 only generates personalized assistance document preview data 182 for one or more assistance documents that have been determined by the data management system 112 to almost certainly include the answer to the user's query has indicated by the query data 142. Thus, the analysis model 124 may generate personalized assistance document previews for one or more assistance documents from the initial search results data 152, while selecting a generic assistance document preview for the other less highly rated assistance documents.

In one embodiment, the analysis model 124 includes a personalized preview generator 130. The personalized preview generator 130 generates the personalized assistance document preview data 182 based on the analysis of the analysis model 124. The personalized preview generator 130 can generate the personalized assistance document preview data 182 based on the analysis from one or both of the natural language processing model 126 and the predictive model 128.

In one embodiment, after the analysis model 124 has generated personalized assistance document preview data 182 four one or more assistance documents included in the initial search results data 152, the user interface 114 outputs the personalized search results data 146. The personalized search results data 146 includes a list of the assistance documents included in the initial search results data 152 as well as the personalized assistance document preview data 182 generated for one or more of the assistance documents. The personalized search results data 146 can include a generic assistance document preview for the remaining assistance documents, if any.

In one embodiment, the title of the assistance document is part of the assistance document preview. Accordingly, generating personalized assistance document preview data 182 can include generating a title for the assistance document personalized based on the attributes of the user. In one embodiment, the assistance documents preview database 119 includes multiple alternate titles for each assistance document. Generating the personalized assistance document preview data 182 can include selecting one of the previously generated alternate titles. Additionally, or alternatively, generating the personalized assistance document preview data 182 can include generating selecting both a previously generated title and a previously generated assistance document preview based on the attributes of the user.

In one embodiment, generating the personalized assistance document preview data can include arranging key words in an F-pattern or in a golden triangle pattern.

In one embodiment, the natural language processing model 126 and the predictive model 128 are each sub models of the analysis model 124. Each sub-model may be trained with a respective machine learning process, such as a supervised, unsupervised, and deep learning unsupervised machine learning processes, according to various embodiments. In one embodiment, the analysis model 124 utilizes both of the sub models in generating personalized assistance document preview data 182. In one embodiment, the analysis model 124 utilizes only a single sub model in generating personalized assistance document preview data 182. In one embodiment, each sub model can be considered a separate analysis model.

Embodiments of the present disclosure address some of the shortcomings associated with traditional data management systems. A data management system in accordance with embodiments of the present disclosure utilizes natural language processing and machine learning processes in order to provide personalized search results to users in real time. The various embodiments of the disclosure can be implemented to improve the technical fields of electronic data management, data processing, data transmission, and data storage. Therefore, the various described embodiments of the disclosure and their associated benefits amount to significantly more than an abstract idea. In particular, by providing accurate and personalized assistance to users, electronic data management is significantly improved.

FIG. 2 includes search results 200 in response to a user query. In the example of FIG. 2, the user has entered query data 142 including "how to enter multiple w2". The search engine 120 has identified several assistance documents that are likely to be relevant to the query data 142. The search results 200 include a list of multiple assistance documents. The search results include an assistance document title 202 and an assistance document preview 204 for each assistance document. In one embodiment, the personalized search results data 146 described in relation to FIG. 1 can be presented to the user in a similar format as the search results 200 including an assistance document title and a personalized assistance document preview. The search results 200 are shown only as an example of how personalized search results data 146 may be presented, according to one embodiment.

Figure 3:
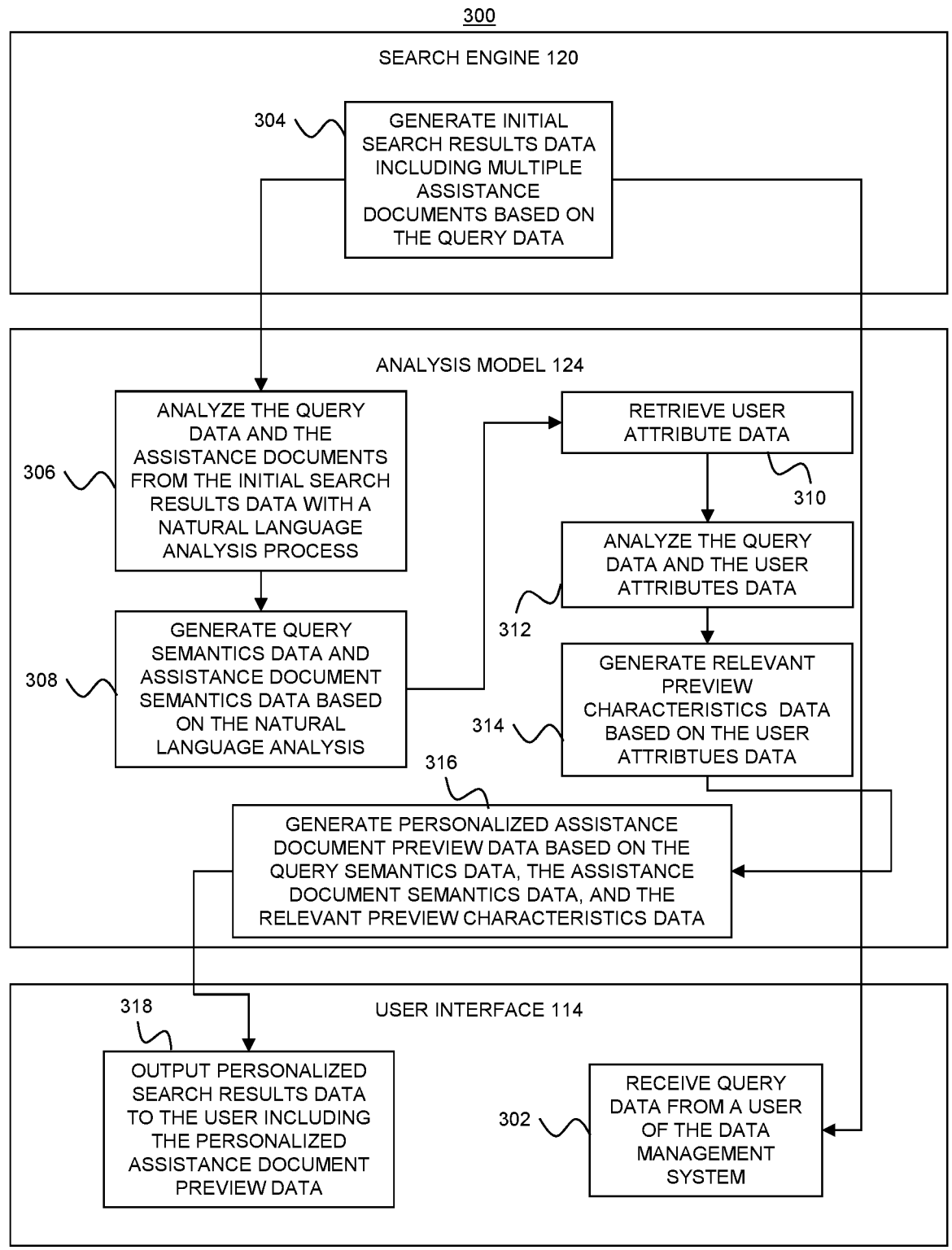
FIG. 3 is a block diagram of a process for providing personalized search results to users of a data management system, in accordance with one embodiment.

FIG. 3 illustrates a functional flow diagram of a process 300 for providing personalized search results to users of a data management system, in accordance with one embodiment.

Referring to FIG. 3, FIG. 1, and the description of FIG. 1 above, at block 302 the user interface 114 receives query data from a user of the data management system, using any of the methods, processes, and procedures discussed above with respect to FIG. 1, according to one embodiment. From block 302 the process proceeds to block 304.

At block 304 the search engine 120 generates initial search results data including multiple assistance documents based on the query data, using any of the methods, processes, and procedures discussed above with respect to FIG. 1, according to one embodiment. From block 304 the process proceeds to block 306.

At block 306 the analysis model 124 analyzes the query data and the assistance documents from the initial search results data with a natural language analysis process, using any of the methods, processes, and procedures discussed above with respect to FIG. 1, according to one embodiment. From block 306 the process proceeds to block 308.

At block 308, the analysis model 124 generates query semantics data and the assistance document semantics data based on the natural language analysis, using any of the methods, processes, and procedures discussed above with respect to FIG. 1, according to one embodiment. From block 308 the process proceeds to block 310.

At block 310, the analysis model 124 retrieves or receives user attribute data related to the user, using any of the methods, processes, and procedures discussed above with respect to FIG. 1, according to one embodiment. From block 310 the process proceeds to block 312.

At block 312 the analysis model 124 analyzes the query data and the user attributes data, using any of the methods, processes, and procedures discussed above with respect to FIG. 1, according to one embodiment. From block 312 the process proceeds to block 314.

At block 314 the analysis model 124 generates relevant preview characteristics data based on the user attributes data, using any of the methods, processes, and procedures discussed above with respect to FIG. 1, according to one embodiment. From block 314, the process proceeds to block 316.

At block 316 the analysis model 124 generates personalized assistance document preview data based on the query semantics data, the assistance document semantics data, and the relevant preview characteristics data, using any of the methods, processes, and procedures discussed above with respect to FIG. 1, according to one embodiment. From block 316, the process proceeds to block 318.

At block 318 the user interface 114 outputs the personalized search results data to the user including the personalized assistance document preview data, using any of the methods, processes, and procedures discussed above with respect to FIG. 1, according to one embodiment.

Those of skill in the art will recognize, in light of the present disclosure, that the process 300 can include different steps, different orders of steps, other than those represented in FIG. 3. All such other processes fall within the scope of the present disclosure.

FIG. 3 illustrates a flow diagram of a process 300 for providing personalized search results to users of a data management system, according to various embodiments.

Figure 4:
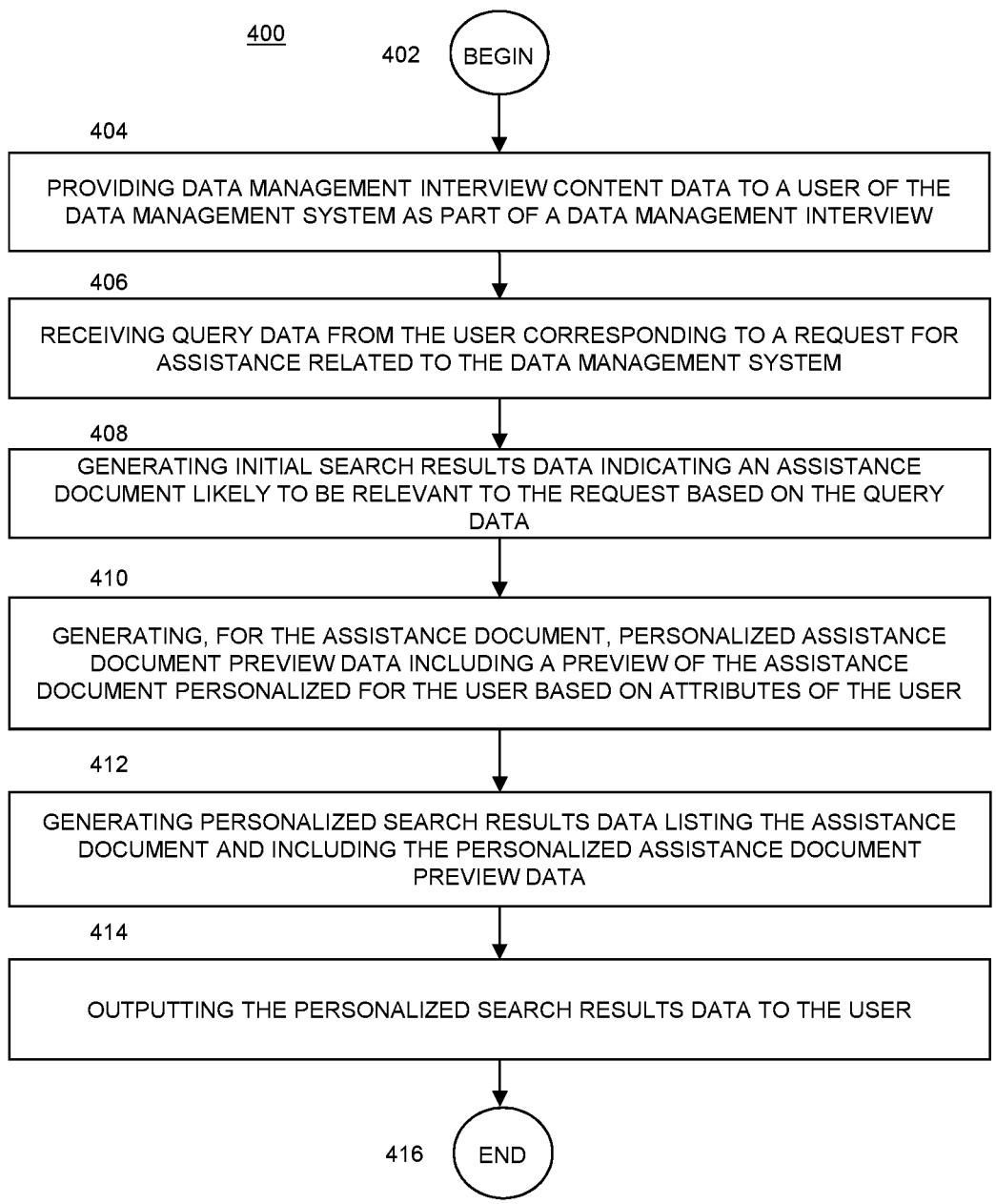
FIG. 4 is a flow diagram of a process for providing personalized search results to users of a data management system, in accordance with one embodiment.

Referring to FIGS. 1, 2, and 4, and the description of FIGS. 1, 3 above, in one embodiment, process 400 begins at BEGIN 402 and process flow proceeds to PROVIDING DATA MANAGEMENT INTERVIEW CONTENT DATA TO A USER OF THE DATA MANAGEMENT SYSTEM AS PART OF A DATA MANAGEMENT INTERVIEW 404.

In one embodiment, at PROVIDING DATA MANAGEMENT INTERVIEW CONTENT DATA TO A USER OF THE DATA MANAGEMENT SYSTEM AS PART OF A DATA MANAGEMENT INTERVIEW 404, data management interview content data is provided to a user of the data management system as part of a data management interview, using any of the methods, processes, and procedures discussed above with respect to FIGS. 1, 3.

In one embodiment, once data management interview content data is provided to a user of the data management system as part of a data management interview, to identify relevant assistance topics for users of a data management system at PROVIDING DATA MANAGEMENT INTERVIEW CONTENT DATA TO A USER OF THE DATA MANAGEMENT SYSTEM AS PART OF A DATA MANAGEMENT INTERVIEW 404 process flow proceeds to RECEIVING QUERY DATA FROM THE USER CORRESPONDING TO A REQUEST FOR ASSISTANCE RELATED TO THE DATA MANAGEMENT SYSTEM 406.

In one embodiment, at RECEIVING QUERY DATA FROM THE USER CORRESPONDING TO A REQUEST FOR ASSISTANCE RELATED TO THE DATA MANAGEMENT SYSTEM 406, query data is received from the user corresponding to a request for assistance related to the data management system, using any of the methods, processes, and procedures discussed above with respect to FIGS. 1, 3.

In one embodiment, once query data is received from the user corresponding to a request for assistance related to the data management system at RECEIVING QUERY DATA FROM THE USER CORRESPONDING TO A REQUEST FOR ASSISTANCE RELATED TO THE DATA MANAGEMENT SYSTEM 406, process flow proceeds to GENERATING INITIAL SEARCH RESULTS DATA INDICATING AN ASSISTANCE DOCUMENT LIKELY TO BE RELEVANT TO THE REQUEST BASED ON THE QUERY DATA 408.

In one embodiment, at GENERATING INITIAL SEARCH RESULTS DATA INDICATING AN ASSISTANCE DOCUMENT LIKELY TO BE RELEVANT TO THE REQUEST BASED ON THE QUERY DATA 408, initial search results data is generated indicating an assistance document likely to be relevant to the request based on the query data, using any of the methods, processes, and procedures discussed above with respect to FIGS. 1, 3.

In one embodiment, once initial search results data is generated indicating an assistance document likely to be relevant to the request based on the query data at GENERATING INITIAL SEARCH RESULTS DATA INDICATING AN ASSISTANCE DOCUMENT LIKELY TO BE RELEVANT TO THE REQUEST BASED ON THE QUERY DATA 408, process flow proceeds to GENERATING, FOR THE ASSISTANCE DOCUMENT, PERSONALIZED ASSISTANCE DOCUMENT PREVIEW DATA INCLUDING A PREVIEW OF THE ASSISTANCE DOCUMENT PERSONALIZED FOR THE USER BASED ON ATTRIBUTES OF THE USER 410.

In one embodiment, at GENERATING, FOR THE ASSISTANCE DOCUMENT, PERSONALIZED ASSISTANCE DOCUMENT PREVIEW DATA INCLUDING A PREVIEW OF THE ASSISTANCE DOCUMENT PERSONALIZED FOR THE USER BASED ON ATTRIBUTES OF THE USER 410, personalized assistance document preview data is generated for the assistance document including a preview of the assistance document personalized for the user based on attributes of the user, using any of the methods, processes, and procedures discussed above with respect to FIGS. 1, 3.

In one embodiment, once personalized assistance document preview data is generated for the assistance document including a preview of the assistance document personalized for the user based on attributes of the user at GENERATING, FOR THE ASSISTANCE DOCUMENT, PERSONALIZED ASSISTANCE DOCUMENT PREVIEW DATA INCLUDING A PREVIEW OF THE ASSISTANCE DOCUMENT PERSONALIZED FOR THE USER BASED ON ATTRIBUTES OF THE USER 410, process flow proceeds to GENERATING PERSONALIZED SEARCH RESULTS DATA LISTING THE ASSISTANCE DOCUMENT AND INCLUDING THE PERSONALIZED ASSISTANCE DOCUMENT PREVIEW DATA 412.

In one embodiment, at GENERATING PERSONALIZED SEARCH RESULTS DATA LISTING THE ASSISTANCE DOCUMENT AND INCLUDING THE PERSONALIZED ASSISTANCE DOCUMENT PREVIEW DATA 412, personalized search results data is generated listing the assistance document and including the personalized assistance document preview data, using any of the methods, processes, and procedures discussed above with respect to FIGS. 1, 3.

In one embodiment, once personalized search results data is generated listing the assistance document and including the personalized assistance document preview data at GENERATING PERSONALIZED SEARCH RESULTS DATA LISTING THE ASSISTANCE DOCUMENT AND INCLUDING THE PERSONALIZED ASSISTANCE DOCUMENT PREVIEW DATA 412, process flow proceeds to OUTPUTTING THE PERSONALIZED SEARCH RESULTS DATA TO THE USER 414.

In one embodiment, at OUTPUTTING THE PERSONALIZED SEARCH RESULTS DATA TO THE USER 414 the personalized search results data is output to the user, using any of the methods, processes, and procedures discussed above with respect to FIGS. 1, 3.

In one embodiment, once the personalized search results data is output to the user at OUTPUTTING THE PERSONALIZED SEARCH RESULTS DATA TO THE USER 414, process flow proceeds to END 416.

In one embodiment, at END 416 the process for providing personalized search results to users of a data management system is exited to await new data and/or instructions.

Figure 5:
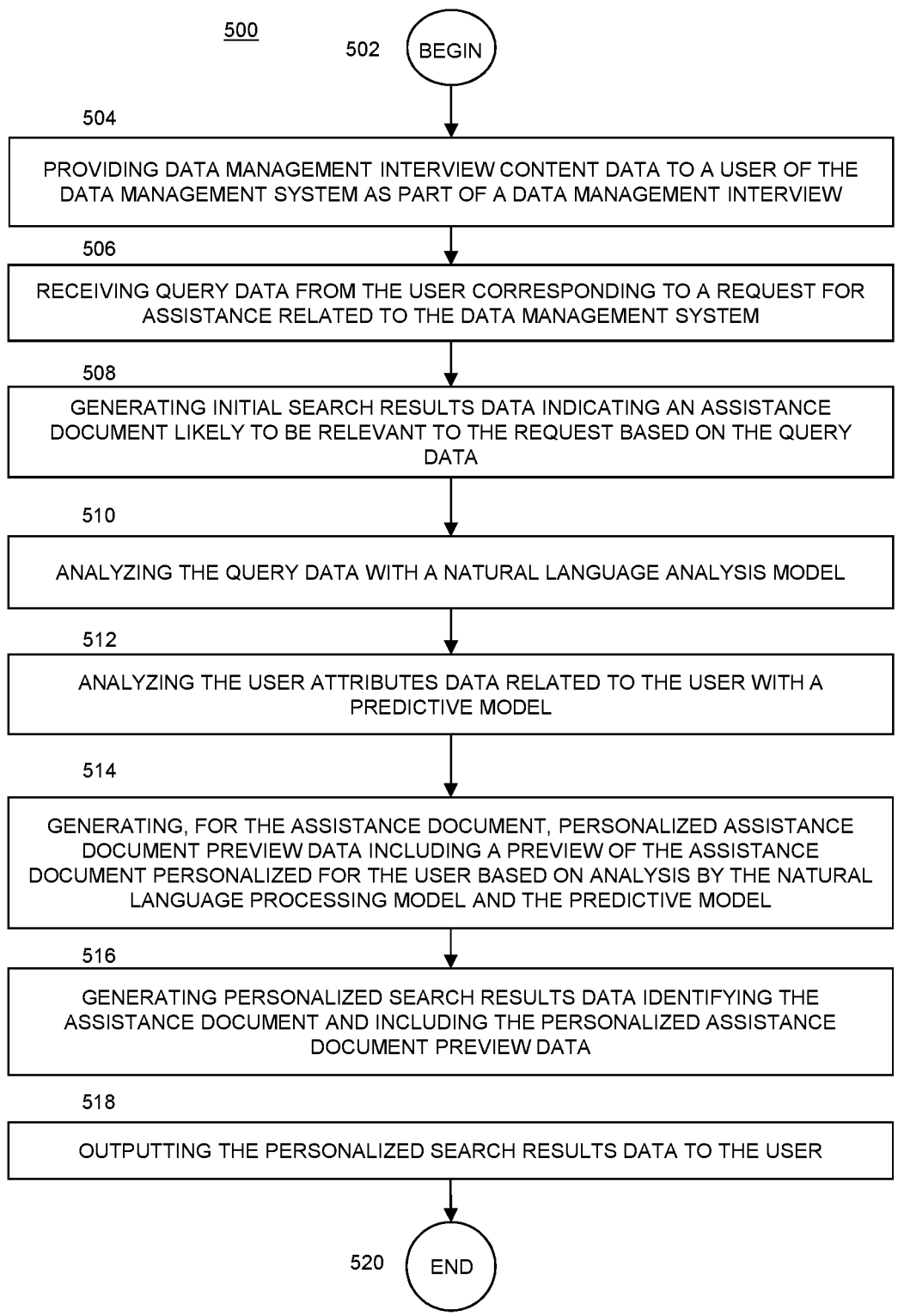
FIG. 5 is a flow diagram of a process for providing personalized search results to users of a data management system, in accordance with one embodiment.

FIG. 5 illustrates a flow diagram of a process 400 for providing personalized search results to users of a data management system, according to various embodiments. Referring to FIGS. 1, 2, and 5, and the description of FIGS. 1, 3 above, in one embodiment, process 500 begins at BEGIN 502 and process flow proceeds to PROVIDING DATA MANAGEMENT INTERVIEW CONTENT DATA TO A USER OF THE DATA MANAGEMENT SYSTEM AS PART OF A DATA MANAGEMENT INTERVIEW 504.

In one embodiment, at PROVIDING DATA MANAGEMENT INTERVIEW CONTENT DATA TO A USER OF THE DATA MANAGEMENT SYSTEM AS PART OF A DATA MANAGEMENT INTERVIEW 504, data management interview content data is provided to a user of the data management system as part of a data management interview, using any of the methods, processes, and procedures discussed above with respect to FIGS. 1, 3.

In one embodiment, once data management interview content data is provided to a user of the data management system as part of a data management interview, to identify relevant assistance topics for users of a data management system at PROVIDING DATA MANAGEMENT INTERVIEW CONTENT DATA TO A USER OF THE DATA MANAGEMENT SYSTEM AS PART OF A DATA MANAGEMENT INTERVIEW 504 process flow proceeds to RECEIVING QUERY DATA FROM THE USER CORRESPONDING TO A REQUEST FOR ASSISTANCE RELATED TO THE DATA MANAGEMENT SYSTEM 506.

In one embodiment, at RECEIVING QUERY DATA FROM THE USER CORRESPONDING TO A REQUEST FOR ASSISTANCE RELATED TO THE DATA MANAGEMENT SYSTEM 506, query data is received from the user corresponding to a request for assistance related to the data management system, using any of the methods, processes, and procedures discussed above with respect to FIGS. 1, 3.

In one embodiment, once query data is received from the user corresponding to a request for assistance related to the data management system at RECEIVING QUERY DATA FROM THE USER CORRESPONDING TO A REQUEST FOR ASSISTANCE RELATED TO THE DATA MANAGEMENT SYSTEM 506, process flow proceeds to GENERATING INITIAL SEARCH RESULTS DATA INDICATING AN ASSISTANCE DOCUMENT LIKELY TO BE RELEVANT TO THE REQUEST BASED ON THE QUERY DATA 508.

In one embodiment, at GENERATING INITIAL SEARCH RESULTS DATA INDICATING AN ASSISTANCE DOCUMENT LIKELY TO BE RELEVANT TO THE REQUEST BASED ON THE QUERY DATA 508, initial search results data is generated indicating an assistance document likely to be relevant to the request based on the query data, using any of the methods, processes, and procedures discussed above with respect to FIGS. 1, 3.

In one embodiment, once initial search results data is generated indicating an assistance document likely to be relevant to the request based on the query data at GENERATING INITIAL SEARCH RESULTS DATA INDICATING AN ASSISTANCE DOCUMENT LIKELY TO BE RELEVANT TO THE REQUEST BASED ON THE QUERY DATA 508, process flow proceeds to ANALYZING THE QUERY DATA WITH A NATURAL LANGUAGE ANALYSIS MODEL 510.

In one embodiment, at ANALYZING THE QUERY DATA WITH A NATURAL LANGUAGE ANALYSIS MODEL 510, the query data is analyzed with a natural language analysis model, using any of the methods, processes, and procedures discussed above with respect to FIGS. 1, 3.

In one embodiment, once the query data is analyzed with a natural language analysis model at ANALYZING THE QUERY DATA WITH A NATURAL LANGUAGE ANALYSIS MODEL 510, process flow proceeds to ANALYZING THE USER ATTRIBUTES DATA RELATED TO THE USER WITH A PREDICTIVE MODEL 512.

In one embodiment, at ANALYZING THE USER ATTRIBUTES DATA RELATED TO THE USER WITH A PREDICTIVE MODEL 512, the user attributes data is analyzed related to the user with a predictive model, using any of the methods, processes, and procedures discussed above with respect to FIGS. 1, 3.

In one embodiment, once the user attributes data is analyzed related to the user with a predictive model at ANALYZING THE USER ATTRIBUTES DATA RELATED TO THE USER WITH A PREDICTIVE MODEL 512, process flow proceeds to GENERATING, FOR THE ASSISTANCE DOCUMENT, PERSONALIZED ASSISTANCE DOCUMENT PREVIEW DATA INCLUDING A PREVIEW OF THE ASSISTANCE DOCUMENT PERSONALIZED FOR THE USER BASED ON ANALYSIS BY THE NATURAL LANGUAGE PROCESSING MODEL AND THE PREDICTIVE MODEL 514.

In one embodiment, at GENERATING, FOR THE ASSISTANCE DOCUMENT, PERSONALIZED ASSISTANCE DOCUMENT PREVIEW DATA INCLUDING A PREVIEW OF THE ASSISTANCE DOCUMENT PERSONALIZED FOR THE USER BASED ON ANALYSIS BY THE NATURAL LANGUAGE PROCESSING MODEL AND THE PREDICTIVE MODEL 514, personalized assistance document preview data is generated, for the assistance document, including a preview of the assistance document personalized for the user based on analysis by the natural language processing model and the predictive model, using any of the methods, processes, and procedures discussed above with respect to FIGS. 1, 3.

In one embodiment, once personalized assistance document preview data is generated, for the assistance document, including a preview of the assistance document personalized for the user based on analysis by the natural language processing model and the predictive model at GENERATING, FOR THE ASSISTANCE DOCUMENT, PERSONALIZED ASSISTANCE DOCUMENT PREVIEW DATA INCLUDING A PREVIEW OF THE ASSISTANCE DOCUMENT PERSONALIZED FOR THE USER BASED ON ANALYSIS BY THE NATURAL LANGUAGE PROCESSING MODEL AND THE PREDICTIVE MODEL 514, process flow proceeds to GENERATING PERSONALIZED SEARCH RESULTS DATA IDENTIFYING THE ASSISTANCE DOCUMENT AND INCLUDING THE PERSONALIZED ASSISTANCE DOCUMENT PREVIEW DATA 516.

In one embodiment, at GENERATING PERSONALIZED SEARCH RESULTS DATA IDENTIFYING THE ASSISTANCE DOCUMENT AND INCLUDING THE PERSONALIZED ASSISTANCE DOCUMENT PREVIEW DATA 516, personalized search results data is generated listing the assistance document and including the personalized assistance document preview data, using any of the methods, processes, and procedures discussed above with respect to FIGS. 1, 3.

In one embodiment, once personalized search results data is generated listing the assistance document and including the personalized assistance document preview data at GENERATING PERSONALIZED SEARCH RESULTS DATA LISTING THE ASSISTANCE DOCUMENT AND INCLUDING THE PERSONALIZED ASSISTANCE DOCUMENT PREVIEW DATA 516, process flow proceeds to OUTPUTTING THE PERSONALIZED SEARCH RESULTS DATA TO THE USER 518.

In one embodiment, at OUTPUTTING THE PERSONALIZED SEARCH RESULTS DATA TO THE USER 518 the personalized search results data is output to the user, using any of the methods, processes, and procedures discussed above with respect to FIGS. 1, 3.

In one embodiment, once the personalized search results data is output to the user at OUTPUTTING THE PERSONALIZED SEARCH RESULTS DATA TO THE USER 518, process flow proceeds to END 520.

In one embodiment, at END 520 the process for providing personalized search results to users of a data management system is exited to await new data and/or instructions.

As noted above, the specific illustrative examples discussed above are but illustrative examples of implementations of embodiments of the method or process for providing personalized search results to users of a data management system. Those of skill in the art will readily recognize that other implementations and embodiments are possible. Therefore, the discussion above should not be construed as a limitation on the claims provided below.

In one embodiment, a computing system implemented method personalizes search results for users of a data management system. The method includes providing data management interview content data to a user of the data management system as part of a data management interview and receiving query data from the user corresponding to a request for assistance related to the data management system. The method includes generating initial search results data indicating an assistance document likely to be relevant to the request based on the query data and generating, for the assistance document, personalized assistance document preview data including a preview of the assistance document personalized for the user based on attributes of the user. The method includes generating personalized search results data identifying the assistance document and including the personalized assistance document preview data and outputting the personalized search results data to the user.

In one embodiment, a computing system implemented method personalizes search results for users of a data management system. The method includes providing data management interview content data to a user of the data management system as part of a data management interview and receiving query data from the user corresponding to a request for assistance related to the data management system. The method includes generating initial search results data indicating an assistance document likely to be relevant to the request based on the query data, analyzing the query data with a natural language processing model, and analyzing the user attributes data related to the user with a predictive model. The method includes generating, for the assistance document, personalized assistance document preview data including a preview of the assistance document personalized for the user based on analysis by the natural language processing model and the predictive model. The method includes generating personalized search results data identifying the assistance document and including the personalized assistance document preview data and outputting the personalized search results data to the user.

In one embodiment, a system for personalizing search results for users of a data management system includes at least one processor and at least one memory coupled to the at least one processor. The at least one memory has stored therein instructions which, when executed by any set of the one or more processors, perform a process. The process includes providing data management interview content data to a user of the data management system as part of a data management interview and receiving query data from the user corresponding to a request for assistance related to the data management system. The process includes generating initial search results data indicating an assistance document likely to be relevant to the request based on the query data and generating, for the assistance document, personalized assistance document preview data including a preview of the assistance document personalized for the user based on attributes of the user. The process includes generating personalized search results data identifying the assistance document and including the personalized assistance document preview data and outputting the personalized search results data to the user.

In one embodiment, a system for personalizing search results for users of a data management system includes at least one processor and at least one memory coupled to the at least one processor. The at least one memory has stored therein instructions which, when executed by any set of the one or more processors, perform a process. The process includes providing data management interview content data to a user of the data management system as part of a data management interview and receiving query data from the user corresponding to a request for assistance related to the data management system. The method includes generating initial search results data indicating an assistance document likely to be relevant to the request based on the query data, analyzing the query data with a natural language processing model, and analyzing the user attributes data related to the user with a predictive model. The method includes generating, for the assistance document, personalized assistance document preview data including a preview of the assistance document personalized for the user based on analysis by the natural language processing model and the predictive model. The method includes generating personalized search results data identifying the assistance document and including the personalized assistance document preview data and outputting the personalized search results data to the user.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term storage container includes, but is not limited to, any physical or virtual data source or storage device. For instance, in various embodiments, a storage container can be, but is not limited to, one or more of a hard disk drive, a solid-state drive, an EEPROM, an optical disk, a server, a memory array, a database, a virtual database, a virtual memory, a virtual data directory, or other physical or virtual data sources.

As used herein, the term application container includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

As used herein, the term query includes, but is not limited to a textual query provided by a user to a data management system and an audible spoken query provided by a user to a data management system. As used herein, the term query data includes, but is not limited to the data representing a textual query or an audible spoken query.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing personalized search results to users of a data management system, the method comprising:
  providing data management interview content data to a user of the data management system as part of a data management interview;
  receiving query data from the user corresponding to a request for assistance related to the data management system;
  generating initial search results data indicating an assistance document likely to be relevant to the request based on the query data;
  training a predictive model, with a machine learning process, to identify characteristics of a preview document that are likely to be relevant to users of the data management system based on attributes of the user;
  generating, for the assistance document, personalized assistance document preview data including a preview of the assistance document personalized for the user based on the identified characteristics of the preview document that are likely to be relevant to users of the data management system;
  generating personalized search results data identifying the assistance document and including the personalized assistance document preview data; and
  outputting the personalized search results data to the user.

2. The method of claim 1, further comprising generating query semantics data identifying semantic characteristics of the query data by analyzing the query data with a natural language processing model.

3. The method of claim 2, further comprising generating a portion of the personalized assistance document preview data based on the query semantics data.

4. The method of claim 3, wherein generating the portion of the personalized assistance document preview data includes incorporating a portion of the query data into the personalized assistance document preview data.

5. The method of claim 2, further comprising generating assistance document semantics data indicating semantic properties of the assistance document by analyzing the assistance document with the natural language processing model.

6. The method of claim 5, further comprising generating the personalized assistance document preview data by selecting portions of the assistance document for inclusion in the personalized assistance document preview based on the assistance document semantics data.

7. The method of claim 5, further comprising generating the personalized assistance document preview data by selecting portions of the assistance document for inclusion in the personalized assistance document preview that are semantically similar to the query data based on the assistance document semantics data and the query semantics data.

8. The method of claim 1, further comprising generating the personalized assistance document preview data by selecting an assistance document preview from a group of assistance document previews associated with the assistance document.

9. The method of claim 1, further comprising:
generating relevant preview characteristics data for the user by analyzing the attributes of the user with the predictive model; and
generating the personalized assistance document preview data based on relevant preview characteristics data.

10. The method of claim 1, wherein the predictive model includes at least one of a Latent Dirichlet Allocation mode, a logistic regression model, a random forest model, a K nearest neighbors model, a linear regression model, a support vector machine model, a linear discriminant analysis model, naïve Bayes model, or a combination thereof.

11. The method of claim 1, wherein the data management system includes at least one of a tax return preparation system, a bookkeeping system, a transaction monitoring system, or a combination thereof.

12. The method of claim 1, wherein the attributes of the user include at least one of demographics data, clickstream data indicating how the user has navigated through services of the data management system, data management data of the user maintained by the data management system, or a combination thereof.

13. The method of claim 1, wherein the initial search results data include a plurality of assistance documents.

14. The method of claim 13, further comprising generating, for each assistance document, personalized assistance document preview data including a preview of the assistance document based on attributes of the user, wherein the personalized search results data lists each assistance document and include the personalized assistance document preview data for each assistance document.

15. A computing system implemented method for providing personalized search results to users of a data management system, the method comprising:
providing data management interview content data to a user of the data management system as part of a data management interview;
receiving query data from the user corresponding to a request for assistance related to the data management system;
generating initial search results data indicating an assistance document likely to be relevant to the request based on the query data;
analyzing the query data with a natural language processing model;
analyzing user attributes data related to the user with a predictive model;
generating, for the assistance document, personalized assistance document preview data including a preview of the assistance document personalized for the user based on analysis by the natural language processing model and the predictive model;
generating personalized search results data identifying the assistance document and including the personalized assistance document preview data; and
outputting the personalized search results data to the user.

16. The method of claim 15, further comprising including in the personalized assistance document preview data an indication that the assistance document includes an image or video if the assistance document includes an image or video and the predictive model indicates that the user likely has a preference for assistance documents that include images or videos.

17. The method of claim 15, further comprising identifying, with the natural language processing model, key terms to include in the personalized assistance document preview data.

18. The method of claim 17, further comprising: generating the personalized assistance document preview data with the key terms positioned in an F shape.

19. The method of claim 17, further comprising generating the assistance document preview data with the key terms positioned according to a golden triangle configuration.

20. The method of claim 15, wherein the attributes data includes at least one of demographics data, clickstream data indicating how the user has navigated through services of the data management system, data management data of the user maintained by the data management system, or a combination thereof.

21. The method of claim 15, further comprising generating, with the predictive model, generates relevant preview characteristics data corresponding to characteristics of an assistance document preview likely to be relevant to the user based on how historical users of the data management system that are similar to the user have selected assistance documents from search results in the past.

22. A system for providing personalized search results to users of a data management system, the system comprising:
at least one processor; and
at least one memory coupled to the at least one processor, the at least one memory having stored therein instructions which, when executed by any set of the one or more processors, perform a process including providing data management interview content data to a user of the data management system as part of a data management interview;
receiving query data from the user corresponding to a request for assistance related to the data management system;
generating initial search results data indicating an assistance document likely to be relevant to the request based on the query data;
training a predictive model, with a machine learning process, to identify characteristics of a preview document that are likely to be relevant to users of the data management system based on attributes of the user;
generating, for the assistance document, personalized assistance document preview data including a preview of the assistance document personalized for the user based on the identified characteristics of the preview document that are likely to be relevant to users of the data management system;
generating personalized search results data identifying the assistance document and including the personalized assistance document preview data; and
outputting the personalized search results data to the user.

23. The system of claim 22, wherein the personalized search results data includes a link to the assistance document.

24. The system of claim 23, wherein the personalized assistance document preview data includes terms not included in the assistance document.

25. The system of claim 22, wherein the personalized assistance document preview data includes a title of the assistance document.

26. The system of claim 22, wherein the personalized assistance document preview data includes an altered title of the assistance document.

27. The system of claim 22, wherein the initial search results data include a plurality of assistance documents.

28. The system of claim 27, further comprising generating, for each assistance document, personalized assistance document preview data including a preview of the assistance document based on attributes of the user, wherein the personalized search results data lists each assistance document and include the personalized assistance document preview data for each assistance document.

\* \* \* \* \*